June 18, 1963  J. REPASKY ET AL  3,094,225
BLOCK HANDLING APPARATUS
Filed June 17, 1959  17 Sheets-Sheet 7
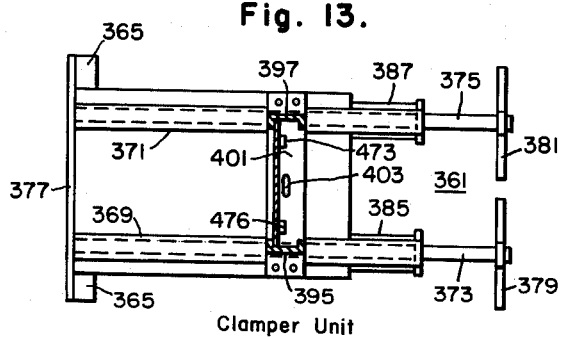
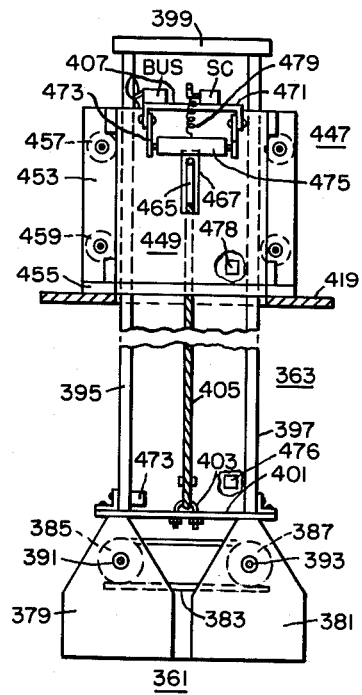
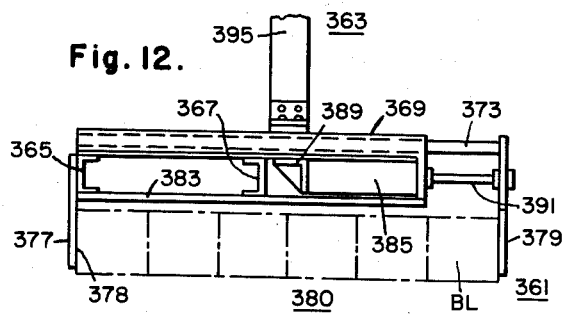
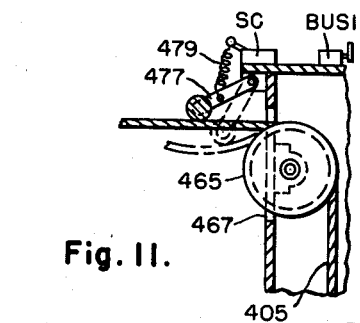
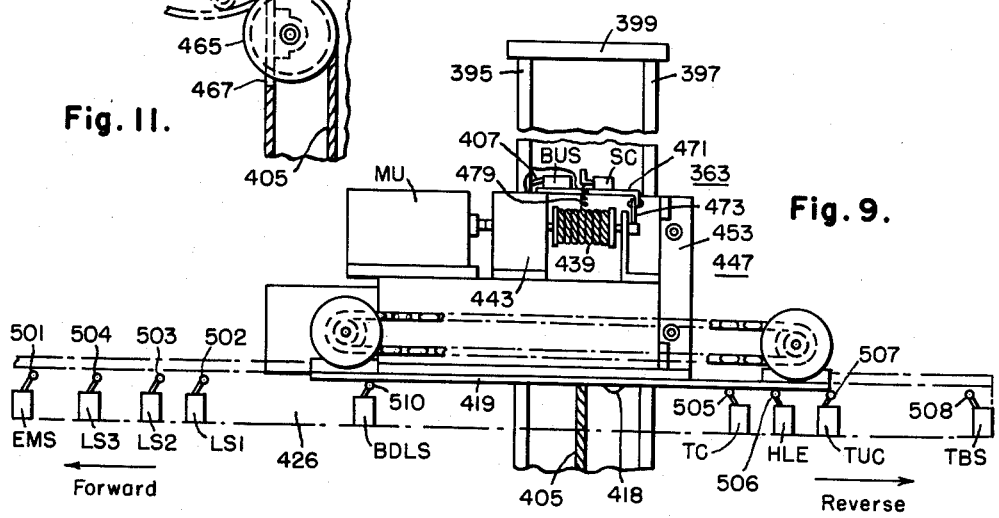

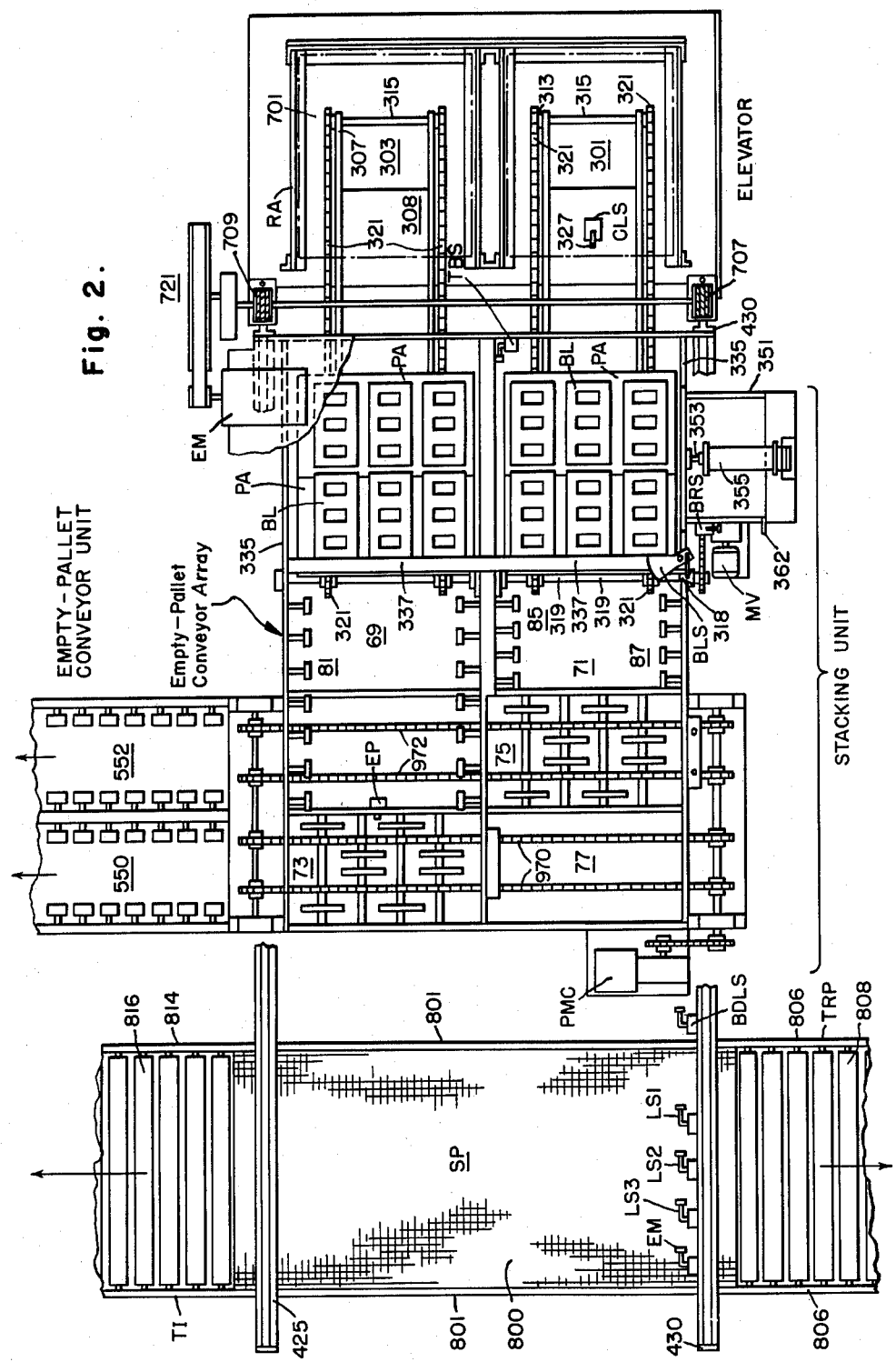

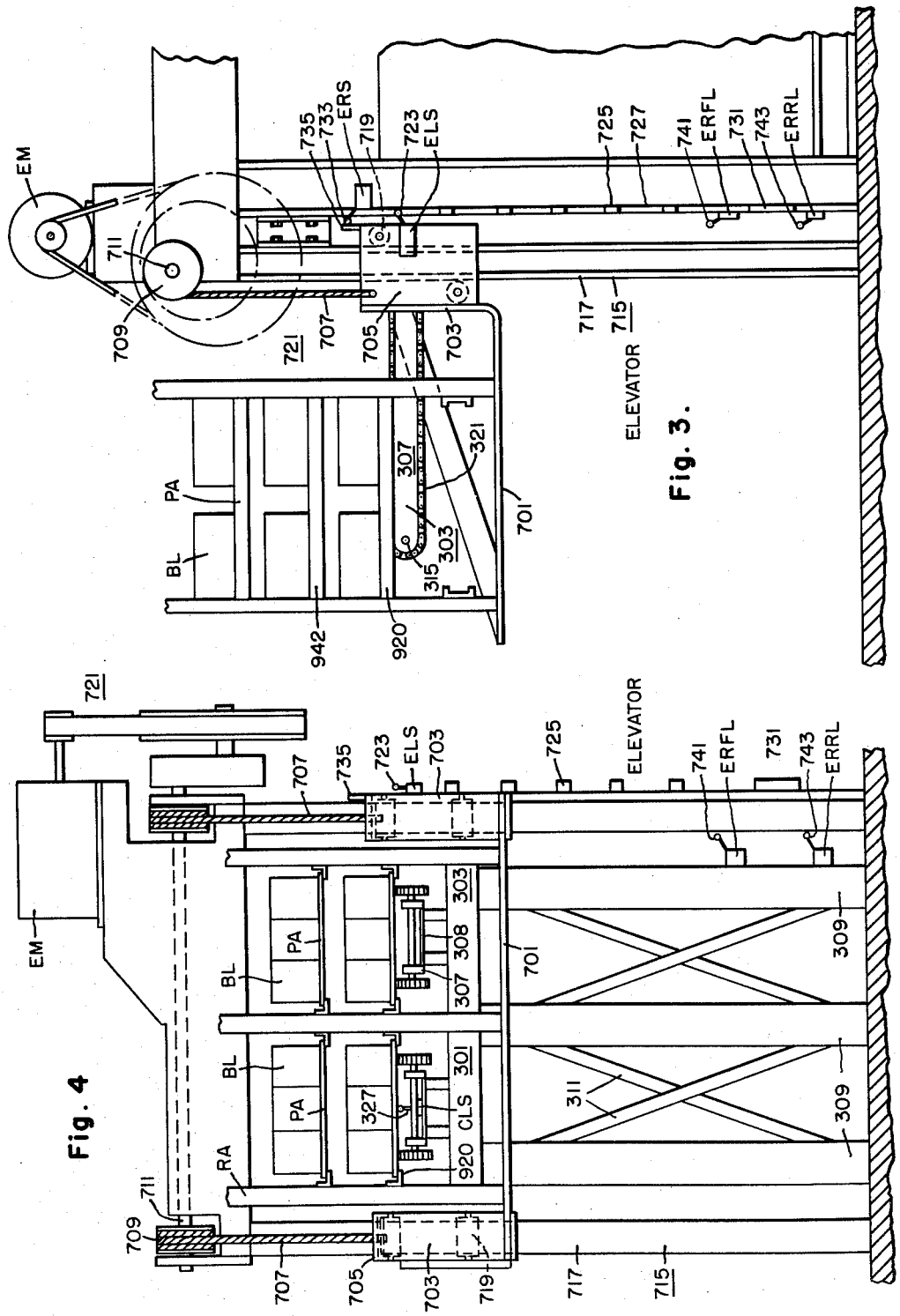

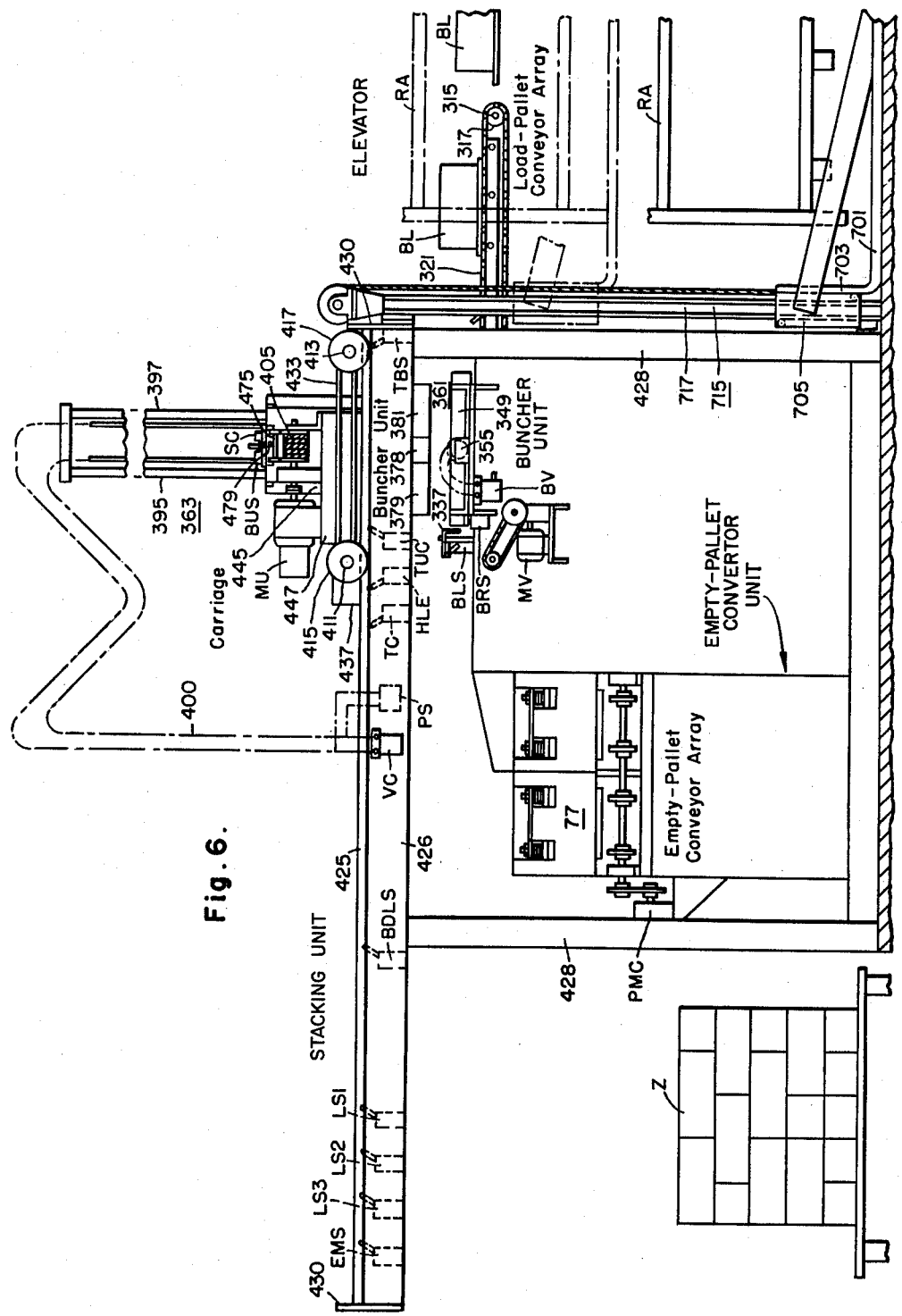

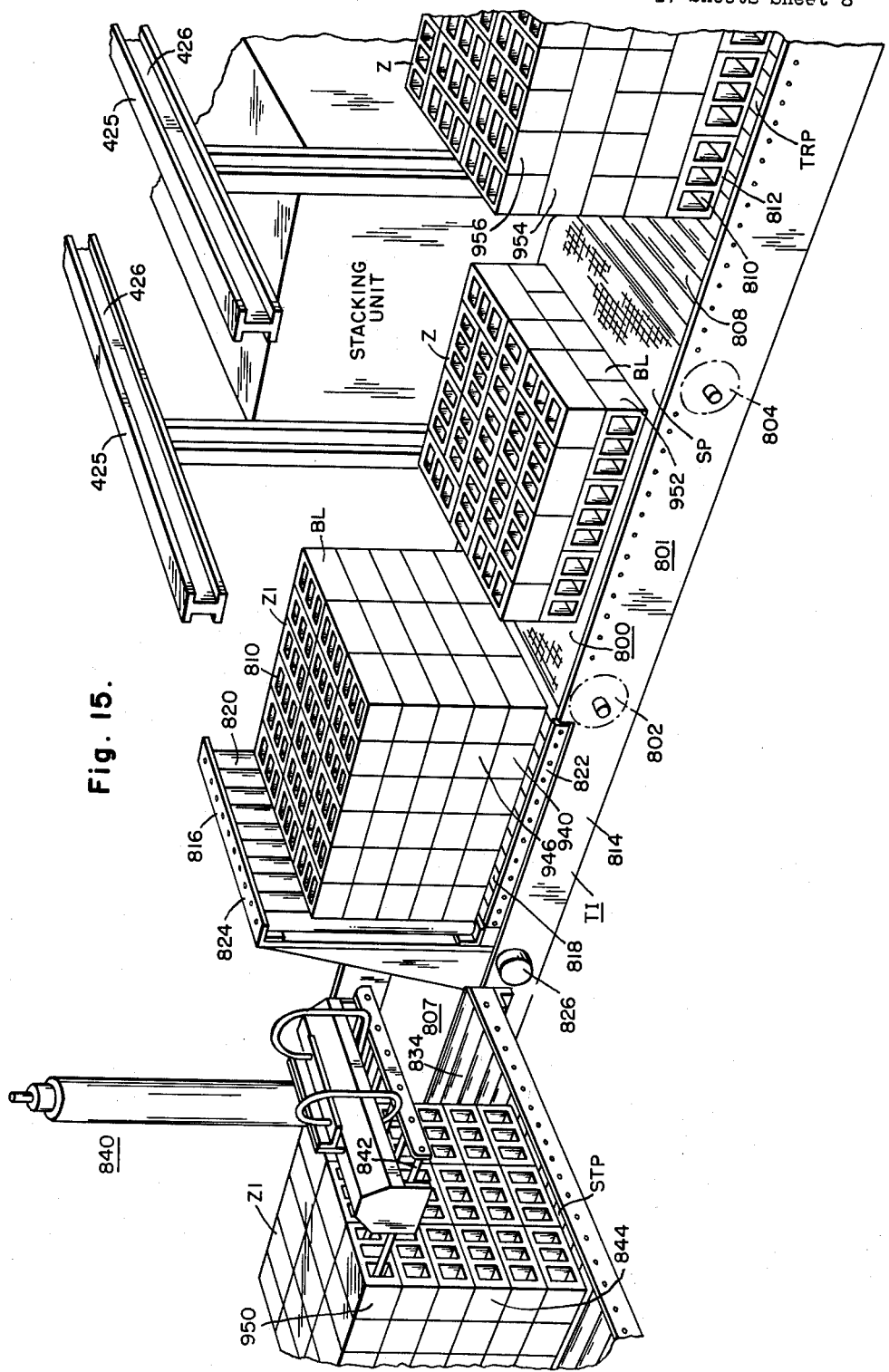

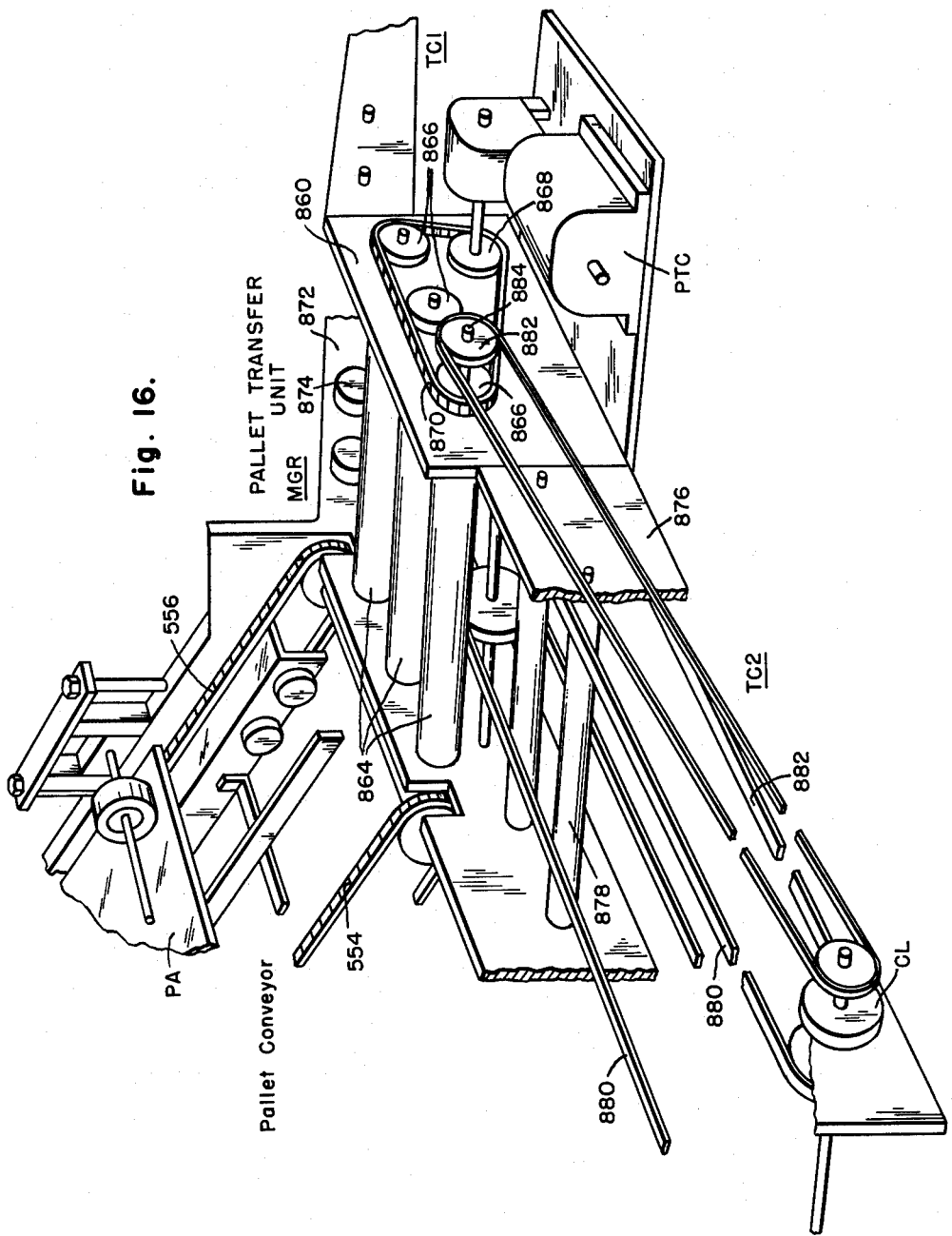

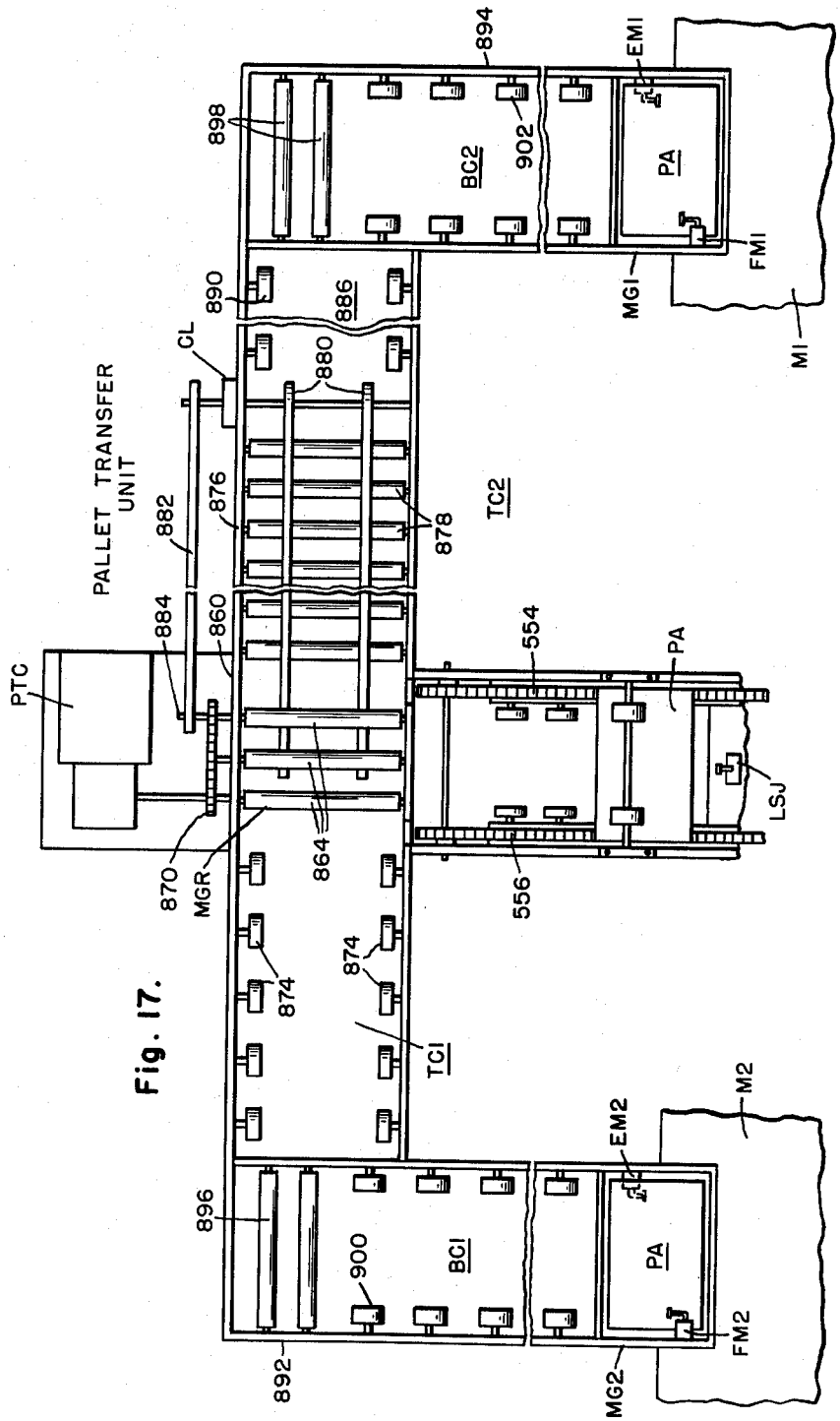

June 18, 1963 J. REPASKY ET AL 3,094,225
BLOCK HANDLING APPARATUS
Filed June 17, 1959 17 Sheets-Sheet 11

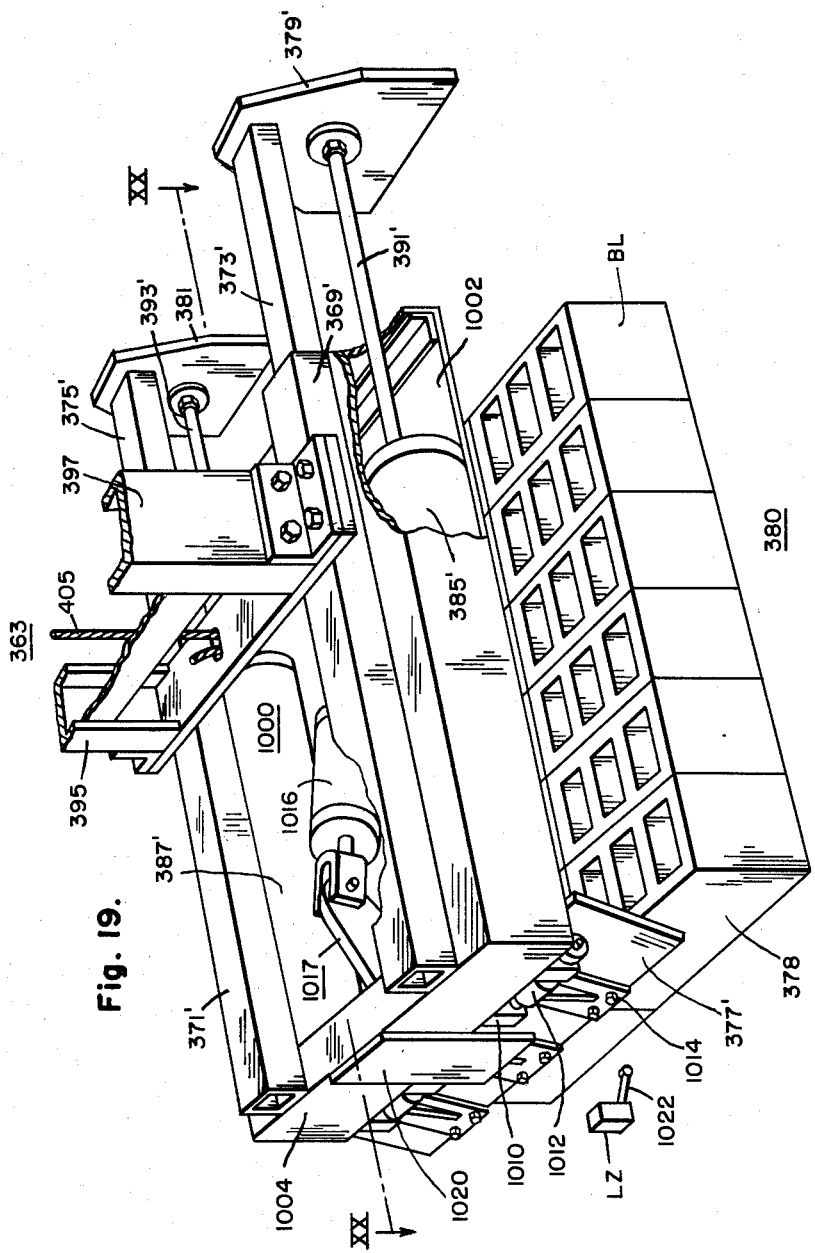

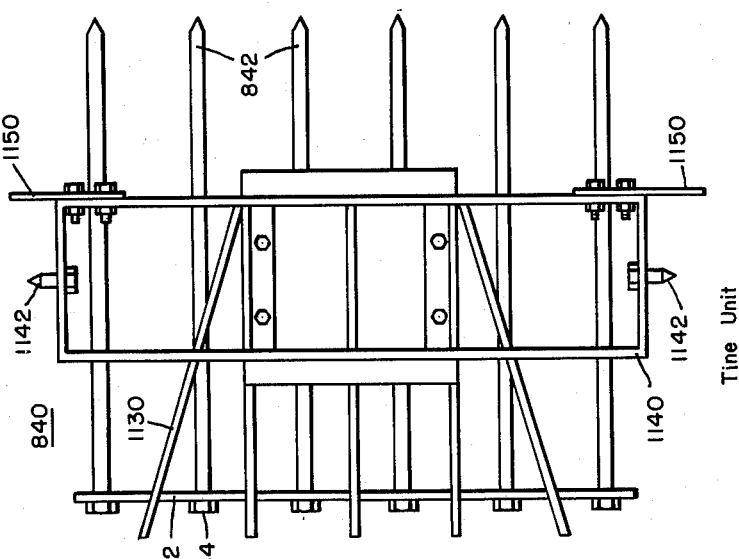
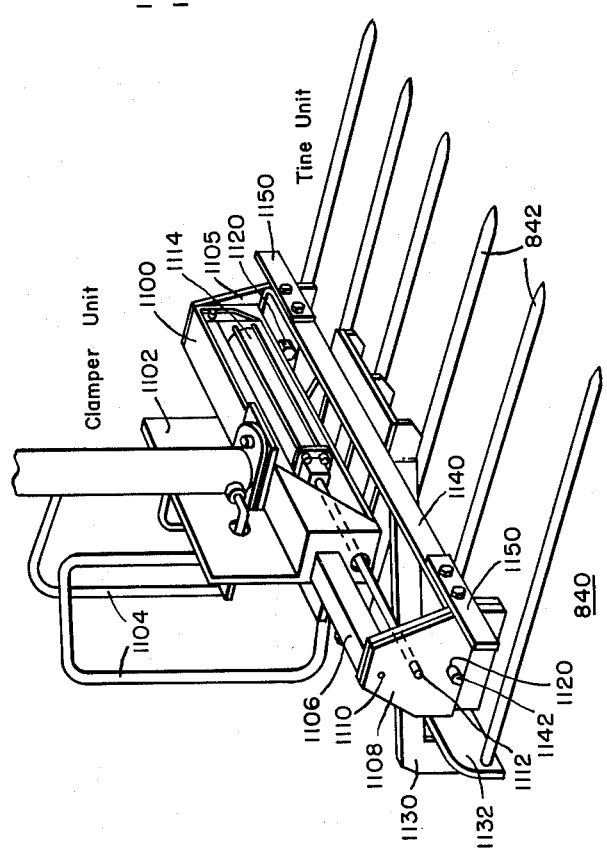

United States Patent Office 3,094,225
Patented June 18, 1963

3,094,225
BLOCK HANDLING APPARATUS
Joseph Repasky and George Repasky, Greensburg, Pa., assignors to Greensburg Concrete Block Co., Greensburg, Pa., a corporation of Pennsylvania
Filed June 17, 1959, Ser. No. 820,966
5 Claims. (Cl. 214—16)

This invention relates to the building-block art, and has particular relation to apparatus for handling the blocks and the pallets on which they are made. This application is a continuation-in-part of application Serial No. 673,753, to Joseph Repasky and George Repasky, filed July 23, 1957, for Block Handling Apparatus, now Patent No. 3,044,637.

The building blocks with which this invention particularly concerns itself are molded from concrete on pallets by a machine such as that shown in Corwin Patent 2,586,210, for example. The block-loaded pallets are transferred from the molding machine to a rack such as is shown on the title page of Besser Manufacturing Company Leaflet, Bulletin 98, and the loaded rack is moved into a drying oven where the blocks are cured. The rack is then removed from the oven to a stacking area where the dry blocks are removed from the pallets, and the pallets are returned to the feed magazine of the machine for further use in molding additional blocks.

Apparatus, in accordance with the teachings of the prior art, for stacking blocks is illustrated on the title page of the Besser Bulletin 98. As shown on this page, the rack is a frame-work structure having a plurality of pairs of ledges at different horizontal levels on which pallets, either loaded or empty, may be supported. In the rack shown there are two pairs of ledges at each level and on each pair two pallets are supported. Each pallet on the rack shown in the Besser leaflet holds three blocks and in the rack shown in the leaflet, there are then twelve blocks on each level. Viewed generally, the rack has a plurality of levels on each of which a plurality of rows (two in the leaflet but any reasonable number generally) of pallets are supported, there being a plurality (two in the leaflet but any reasonable number generally) of pallets in each row.

The leaflet shows a block cuber for removing the blocks to a stack. This cuber is a clamping mechanism having pivotal jaws capable of engaging only the blocks on one pallet at a time. Usually this is three eight inch wide blocks or the equivalent in width of blocks of lesser width. The cuber is operated by an attendant who uses it to remove the blocks on one pallet at a time from the pallets on a rack to a pile. After the blocks are removed, the rack and its pallets are returned to a position where the pallets may be removed and fed into the magazine of the block molding machine.

Prior art block-handling apparatus has the disadvantage that its demand for manual labor is excessively high. For example, manual labor is required to handle a cuber such as Besser's. Since the blocks are heavy each laborer stacks the blocks at a relatively low rate and a number of laborers is usually required to keep up with a machine delivering the blocks at the rate now current in the block-making industry which may be as high as 4000 per day even in a small plant. In addition, laborers are required for returning the pallets to the block making machine.

It is, accordingly, a principal object of this invention to reduce the manual labor demand in block handling.

Another object of this invention is to provide block-handling apparatus which shall be capable of stacking blocks at a high rate commensurate with the rate at which blocks are produced even by a plurality of block-making machines.

A further object of this invention is to provide block-handling apparatus which shall include facilities for stacking the blocks from block-loaded pallets and returning the empty pallets to the machine with a minimum of manual labor.

A still further object of this invention is to provide apparatus which shall, without any appreciable demand for manual labor, transfer cured blocks on a rack to a stack, return the pallets on which these blocks are cured to molding apparatus for further use and return the racks for further use.

In accordance with one aspect of this invention, all of the block loaded pallets on each level or shelf are removed as a unit automatically by conveyor apparatus which cooperates directly with the rack to accomplish this purpose. Once removed the loaded pallets are advanced by the conveyor for processing.

A further aspect of this invention involves the transfer of the loaded pallets on the different levels of the rack to the conveyor and it is an object of this invention to provide apparatus for automatically transferring the loaded pallets on a rack to a conveyor.

An ancillary object of this invention is to provide an elevator particularly suitable for transferring loaded pallets from a rack to a conveyor.

Another ancillary object of this invention is to provide facilities cooperative with a rack elevator for automatically removing empty racks from the elevator.

An additional aspect of this invention arises from the circumstance that each level of the rack has a plurality of separate loaded pallets and the blocks on the separate pallets delivered by the conveyor apparatus are separated. It is essential that the blocks be bunched automatically for stacking and it is another specific object of this invention to provide apparatus for bunching the blocks on a plurality of pallets automatically as they are conveyed to the bunching position as a unit.

Another aspect of this invention arises from the realization that the empty-pallet conveyor disclosed in FIGS. 8, 9, 10 and 11 of Patent 2,990,069 granted June 27, 1961 to Joseph Repasky and George Repasky could serve to return the unloaded pallets automatically to the molding machine after the blocks are removed for stacking. The realization of this aspect of the invention involves the cooperation of the loaded-pallet conveyor apparatus in accordance with this invention, and the conveyor in accordance with Patent 2,990,069. The cooperation of these conveyors requires that the blocks on the loaded pallets be separated from the pallets and it is a further specific object of this invention to provide apparatus cooperative with block-loaded pallet conveyor apparatus and an empty-pallet conveyor for separtaing the blocks on the pallets, from and permitting the pallets, to be transmitted on the empty-pallet conveyor.

A further aspect of this invention involves the transfer of the blocks from the position where they are bunched to the stacking position, and it is a further specific object of this invention to provide apparatus for effecting such transfer.

It is another specific object of this invention to provide a novel clamping unit capable of engaging a generally horizontal assembly of blocks at one position, removing this assembly from this position to a stacking position and releasing the assembly properly at the stacking position.

An incidental object of this invention is to provide a carriage which shall cooperate with the clamping unit to move the block assembly from the bunching position to the stacking position and to stack the blocks properly.

A further incidental object of this invention is to provide a drive for such a stacking unit which shall permit the block assembly to be stacked with the respective blocks of these assemblies staggered so that the stacks will be firm.

In its specific aspects this invention lends itself advantageously to use in a plant in which foundation building blocks or tile are made. The blocks are stacked in stacks having the form of a rectangular parallelepiped on a platform and the stacks are removed usually by a fork lift from the platform to transfer areas where they are loaded on trucks. The blocks are hollow having openings which extend through one set of opposite faces and the tines of the fork lift can readily engage the blocks in the openings. So that the tines may be applied in this manner, it is desirable that the openings in the blocks of the lower tier of a stack on the platform be horizontal and face in a direction outwardly from the platform. But the blocks are disposed on the rack with their openings vertically and they are removed from the rack, bunched and stacked with their openings vertically.

It is then an object of this invention to provide apparatus for stacking blocks on a platform which shall produce stacks, the blocks in the lowest tiers of which shall be arranged with their openings horizontally and facing outwardly so as to be readily engaged by the tines of a fork lift.

It is an ancillary object of this invention to provide a novel tilting assembly for converting a stack of blocks stacked with their openings vertically into a stack in which the openings in the blocks are horizontal which assembly shall be particularly suitable for integration into stacking apparatus in accordance with this invention.

In the practice of this invention the block outputs of several machines are usually stacked and the pallets are automatically returned to the machines. It is necessary that the pallets be distributed among the pallet magazines of the different machines so that each machine has an adequate number of pallets and it is a specific object of this invention to accomplish this purpose.

An ancillary object of this invention is to provide a selective pallet conveyor, particularly suitable for integration into stacking apparatus in accordance with this invention, which conveyor shall be cooperative with the magazines of a plurality of block making machines and shall operate to supply pallets to the magazines selectively so as to maintain an adequate number of pallets in each magazine.

The apparatus in accordance with this invention includes an array of loaded-pallet conveyors corresponding in number to the rows of loaded pallets on each level of the rack. In accordance with a specific aspect of this invention a rack elevator is provided which is disposed cooperatively with the loaded-pallet conveyors. The elevator may be moved successively to different levels at each of which the conveyors are in pallet unloading relationship with the loaded pallets on different levels or shelves of the rack. In the usual practice of this invention the rack is deposited on the elevator when the elevator is above its highest level. The elevator is dropped to successively lower levels and at each level the conveyors unload the loaded pallets on a level of the rack. When the elevator reaches a level below the level at which the last pallets are conveyed from the rack, a rack unloader is automatically actuated and removes the empty rack from the elevator. The elevator may then be raised for another rack unloading operation. In accordance with another aspect of this invention the elevator operating mechanism is tied into the stacking apparatus so that the different levels of a rack are unloaded in proper sequential order in the stacking operation.

In accordance with this invention, the loaded pallet conveyors are controlled by the loaded pallets themselves as they are dropped onto the conveyors by the Elevator. These conveyors include pallet actuable switch means which is closed when it is engaged by the loaded pallets and closes the conveyor-drive circuit to advance the conveyors. (The switch means can also be closed by empty pallets.) The drive circuit automatically remains closed long enough to advance the pallets to the bunching position. When the bunching means starts to operate, the conveyors have stopped.

The loaded pallet conveyors in accordance with this invention communicate with a corresponding array of empty-pallet conveyors as disclosed in FIGS. 8, 9, 10 and 11 of Patent 2,990,069. At the junction between the conveyor arrays the blocks are separated from the pallets and the pallets are returned to the block making machine as shown in FIG. 1 of Patent 2,990,069. For separating the blocks and the pallets, a block stopping mechanism is provided between the conveyor arrays. This block stop extends generally perpendicular to the direction of movement of the loaded pallets so that when the loaded pallets are advanced to this block stop, the blocks on the pallets are stopped while the empty pallets are moved through a slot in the stop onto the empty pallet conveyors.

The apparatus, in accordance with this invention, also includes a buncher cooperative with the block stop. This buncher includes a pushing mechanism or pusher on one side of the loaded-pallet conveyor array which is actuable automatically by the blocks when, as they are advanced by the loaded-pallet conveyors, they approach the block stop, and pushes the blocks on the separate conveyors together into a bunched assembly of generally rectangular form. The assembly is generally horizontal and when formed is bounded on one side by the block stop, and on another side by the pusher. The pusher is adjustable in a direction along the block stop so that the extent of the movement of the blocks which it pushes may be controlled. The pusher usually pushes the blocks together into a loose assembly so that they may be engaged by a clamper. The clamper compresses the blocks into a tighter assembly. In situations in which a clamper, in accordance with this invention, having adequate jaw separation is available, the pusher may be dispensed with.

The apparatus, according to this invention, also includes a carriage which is movable on a track extending over the conveyors between a position over the bunching area and a position over the stacking area. The carriage carries and guides a clamping unit. This unit consists of a boom and a clamper. The clamper unlike prior art clampers is particularly adapted to engage and hold the generally rectangular horizontal assembly of blocks. This clamper includes jaw means extending from a support adapted to span the assembly with the jaws parallel to two of the parallel sides of the assembly. Such a clamper may be lowered vertically to a position in which it spans the assembly. The jaws may then be engaged with the assembly and the clamper raised.

The boom is guided by rollers in the carriage and carries the clamper at its lower end. The clamping unit is movable upwardly and downwardly by a winch, on the carriage. The cable of the winch preferably engages the clamper. This cable cooperates with a switch mechanism which maintains the drum of the winch in rotation so long as the cable is tensioned as the unit is being lowered and stops the rotation when the clamper reaches the position over the block assembly and the cable relaxes.

In the use of the apparatus, the carriage is moved over the bunching region and the clamper is lowered and engaged with the blocks. Then the clamping unit is raised and the carriage is moved to the stacking area. The clamping unit is then lowered and the clamper released to release the blocks in the assembly in which they have been stacked.

The carriage is controlled by switch mechanisms so that it may be stopped in a first position or a second position when it reaches the stacking area. The positions are separated by a distance which may be generally a fraction, for example, one half or one third, of the width of the individual blocks in the assembly in the direction along the tracks. The switch mechanisms are so interlocked that the carriage stops in each of the positions during alternate stacking operations. Thus the blocks are stacked in staggered relationship.

In the practice of this invention, the blocks are delivered to a stacking platform which is provided with facilities for advancing the stack in one direction or the other. The stacker stacks the blocks with their holes vertically. To provide for the transport of the blocks by a fork-lift each stack is based on a tier of blocks with their holes horizontally and facing outwardly from the platform. These tiers are derived from a stack which is periodically tilted and deposited on a storage platform.

The tilter which is provided in accordance with an aspect of this invention for this purpose includes platforms at right angles which may be rocked or tilted as a unit from a position in which one platform is horizontal and the other vertical to a position in which the latter is horizontal and the former vertical. In accordance with this invention one of the platforms of the tilter is mounted so that when it is horizontal it is contiguous with the stacking platform. This tilting platform has rollers so that a stack on the stacking platform advanced onto the horizontal tilting platform moves into engagement with the vertical platform. With the stack in this latter position, the tilter is tilted and the erstwhile vertical platform set in the horizontal position while the erstwhile horizontal platform is set in the vertical position. The stack engaging the now horizontal platform has tiers formed of blocks with their holes horizontal. It is now desirable to set this stack so that its tiers can conveniently be transferred to the stacking platform and for this purpose a storage platform contiguous to the now horizontal tilting platform and at right angles to the tilting and stacking platforms is provided. In addition, the now horizontal tilting platform and the storage platform are in accordance with this invention provided with rollers so that the tilted stack is readily moved to the storage platform.

From the storage platform the tiers are removed one at a time by a fork-lift which deposits each on the stacking platform to serve as a base for each new stack. As each tilted stack is exhausted, a new one is deposited on the storage platform. The storage platform also has the advantage that it frees the tilter to make a number of stacks with base tiers (holes horizontally) which may be stored on the storage platform. Thus during a long period of operation it is not necessary to stop to make base tiers. In addition, the storage platform permits the storing of stacks of base tiers for blocks of different dimensions.

The empty pallets are transmitted through the block stop and are returned to the magazines of the block-making machines by the empty pallet conveyor. For distributing the empty pallets effectively among the magazines of the machines a pallet transfer unit is provided in accordance with this invention. This unit includes a transfer magazine provided with advancing means which may be set selectively to advance the pallets to the magazine of one machine or the other. The empty pallets are deposited in this transfer magazine and the advancing means is set by selective switch means responsive to the pallets in the several machine magazines to supply pallets in accordance with the emptiness or fullness of the respective magazines of the machines.

The novel features considered characteristic of this invention are disclosed generally above. The invention, itself, both as to its organization and as to its method of operation, together with additional objects and advantages thereof, will be understood from the following description of a specific embodiment when read in connection with the accompanying drawings, in which:

FIG. 2 is a view in plan of the apparatus in accordance with this invention, showing the cooperative relationship between the Elevator, the Stacking Unit and the Empty-Pallet Conveyor Unit.

FIG. 3 is a view in side elevation, and FIG. 4 is a view in end elevation looking into the Stacking Unit, of the Elevator according to this invention;

FIG. 6 is a view in side elevation of the Stacking Unit according to this invention;

FIG. 9 is a view in side elevation of the carriage shown in FIG. 8;

FIG. 10 is a view in side elevation of the clamper unit according to this invention;

FIG. 11 is a fragmental view, partly in section and partly in side elevation of the winch control mechanism in accordance with this invention;

FIG. 12 is a view in side elevation of a clamper in accordance with this invention;

FIG. 13 is a plan view of the clamper shown in FIG. 12;

FIG. 15 is a view in perspective showing the cooperative relationship according to the invention between the Tilting Unit and the Stacking Unit;

FIG. 16 is a view in perspective showing the Pallet Transfer Unit according to this invention;

FIG. 17 is a view in plan showing the cooperative relationship according to this invention between the Empty-Pallet Conveyor, the Pallet Transfer Unit and the Molding Unit;

Figure 20:
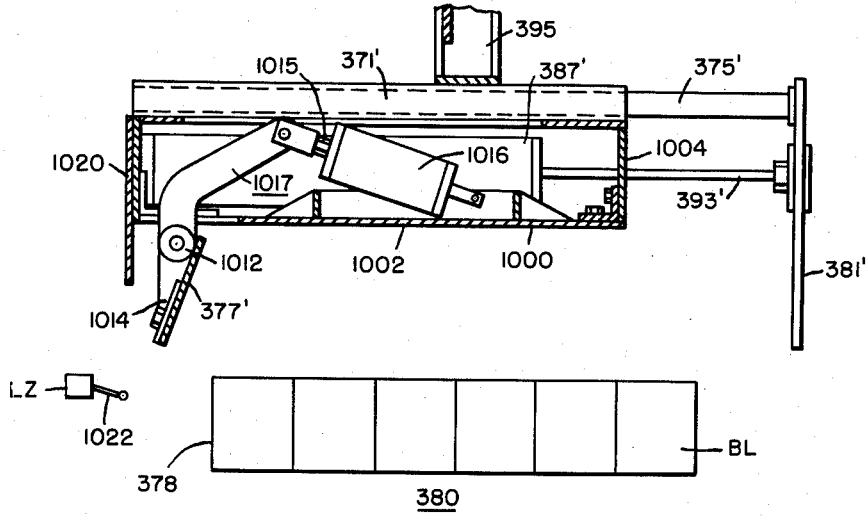
Figure 21:
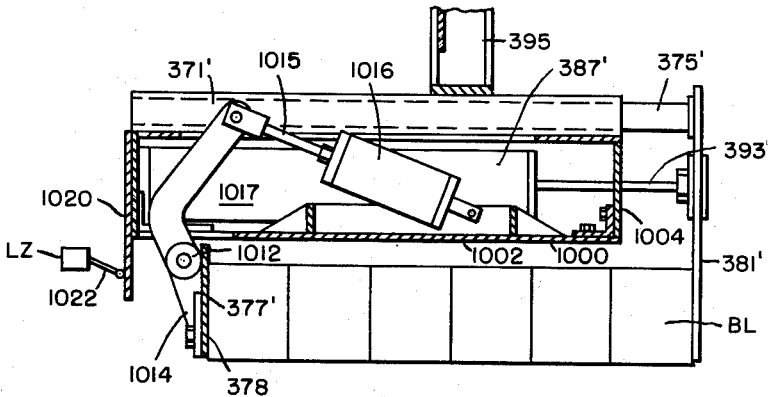

FIGS. 18A, 18B, 18C and 18D together constitute a schematic of the electrical control for the apparatus in accordance with this invention;

FIG. 19 is a view in perspective showing a modification of the clamper shown in FIGS. 6, 10, 12 and 13;

FIG. 20 is a view in section taken along line XX—XX of FIG. 19 with the clamper about to engage a bunched tier 380 of blocks;

FIG. 21 is a like view in section but showing the clamper in engagement with the tier;

FIG. 22 is a view in perspective of a novel fork-lift in accordance with an aspect of this invention; and FIG. 23 is a view in top elevation of the true assembly of the fork-lift shown in FIG. 22.

*Description*

The apparatus shown in the drawings includes a Molding Unit, an Elevator, a Rack Removal Unit, a Stacking Unit, a Tilting Unit, an Empty Pallet Conveyor Unit, and a Pallet Transfer Unit. This apparatus conveniently lends itself into subdivision into the above-listed units on a functional rather than a structural basis and parts of any of the units may be structurally integral or joined to parts of other units.

This apparatus includes a plurality of drives energized from conductors L1, L2, L3 (FIGS. 18A–18D) which are adapted to be connected to the polyphase buses of a commercial supply through the usual disconnects or circuit breakers (not shown). The drives are controlled from relays and switches which may be energized from supply conductors AL1 and AL2. Conductors AL1 and AL2 may derive their power from two of the conductors L1, L2, L3 or from the commercial buses through a transformer. In addition, conductors AL3 and AL4 energized similarly to conductors AL1 and AL2 are provided for energizing other parts of the apparatus.

The Molding Unit includes a plurality of molding machines M1 and M2 which may be similar to the machines disclosed in Corwin Patent 2,586,510. Each machine has a magazine MG1 and MG2 respectively into which empty pallets PA are deposited by the Pallet Transfer Unit. The pallets PA are fed to the molding mechanisms of the machines M1 and M2 and molded building blocks BL are deposited while wet on the pallets PA and the block-loaded pallets are delivered by the machines at the output tables whence they are loaded as shelves at different levels of a rack RA. Typically each machine M1 and M2 produces one loaded pallet PA during each operation, each pallet carrying three blocks BL (FIGS. 2, 3, 4) with their holes vertically.

The Molding Unit also includes a drier CU into which the racks RA loaded with wet blocks are deposited for curing. After the curing operation is completed, the loaded racks are transferred to the Elevator.

The Elevator (FIGS. 3 and 4) includes a horizontal platform 701 from the ends of which vertical strips 703 extend at right angles. Hollow brackets 705 of rectangular transverse section are secured to the strips 703. The platform 703 is suspended cantilever fashion from the brackets 705 by cables 707 wound on sheaves 709. The sheaves 709 are mounted rotatable with a shaft 711 journaled in a bracket 713 mounted on channel shaped columns 715 which are braced on the columns 428 that support the tracks 426 of the Stacking Unit (FIG. 6). The sides 717 of the columns 715 serve as guides for the brackets 705 and for this purpose are engaged by rollers 719 rotatable in the walls of the brackets 705 which are at right angles to the sides 717.

The sheaves 709 are driven from a motor EM (FIG. 18A) mounted on bracket 713 through a belt and pulley system 721. The motor EM is controlled by a limit switch ELS (FIG. 18A) which is carried by one of the brackets 705 and the arm 723 of which is adapted to engage vertically spaced knobs 725 on a column 727 parallel and adjacent to the column 715 guiding the bracket 705 carrying the switch ELS. The switch ELS is opened on each engagement of the arm 723 with a knob 725 and deenergizes the circuit of motor EM. But because of inertia of the platform 701, the arm 723 is disengaged before the platform stops and the motor circuit is conditioned for another operation.

The knobs 725 are so spaced that the platform 701 moves a distance corresponding to the distance between shelves of the rack RA on starting with arm 723 just below one knob 725 and stopping with arm 723 just below the adjacent lower knob 725. The lowest knob 731 is so long that when arm 723 engages it, switch ELS remains open in the lowest position of the platform 701.

Another limit switch ERS is mounted on column 727 above the highest button 725. The arm 733 of this switch is adapted to be engaged by a projection 735 on the adjacent bracket 705. When the arm 733 is so engaged, switch ERS is opened to deenergize the motor EM in the highest position of the platform 701 (FIG. 18A).

Stop switches ERFL and ERRL are mounted on one of the columns 309 in a position such that their arms 741 and 743 respectively are successively engaged by the adjacent bracket 705 as it moves downwardly. The bracket 705 moves continuously between arms 741 and 743 until it engages both arms. Engagement of the bracket 705 with arm 741 closes switch ERFL to energize the empty rack remover motor ERM (FIG. 18A). This moves the empty rack vehicle ERV into position to engage a rack RA which has been unloaded. The vehicle ERV actuates switch ERFS which stops the vehicle ERV with its tines 745 under the descending empty rack RA, and drops the Elevator to its lowest position where the arm 743 of switch ERRL is engaged. This reverses motor ERM and the empty rack RA is removed from the platform 701.

The Rack Removal Unit includes the vehicle ERV having the tines 745. The vehicle ERV is movable on a track 751 by the motor ERM within the vehicle. The track 751 extends to the position occupied by the platform 701 as it moves from the position where 705 engages 741 to the position where it engages 743. When the vehicle ERV is at the end of the track, the tines 745 extend under the empty rack RA so as to engage the angles 733 which define the lowest shelf.

Figure 18A:
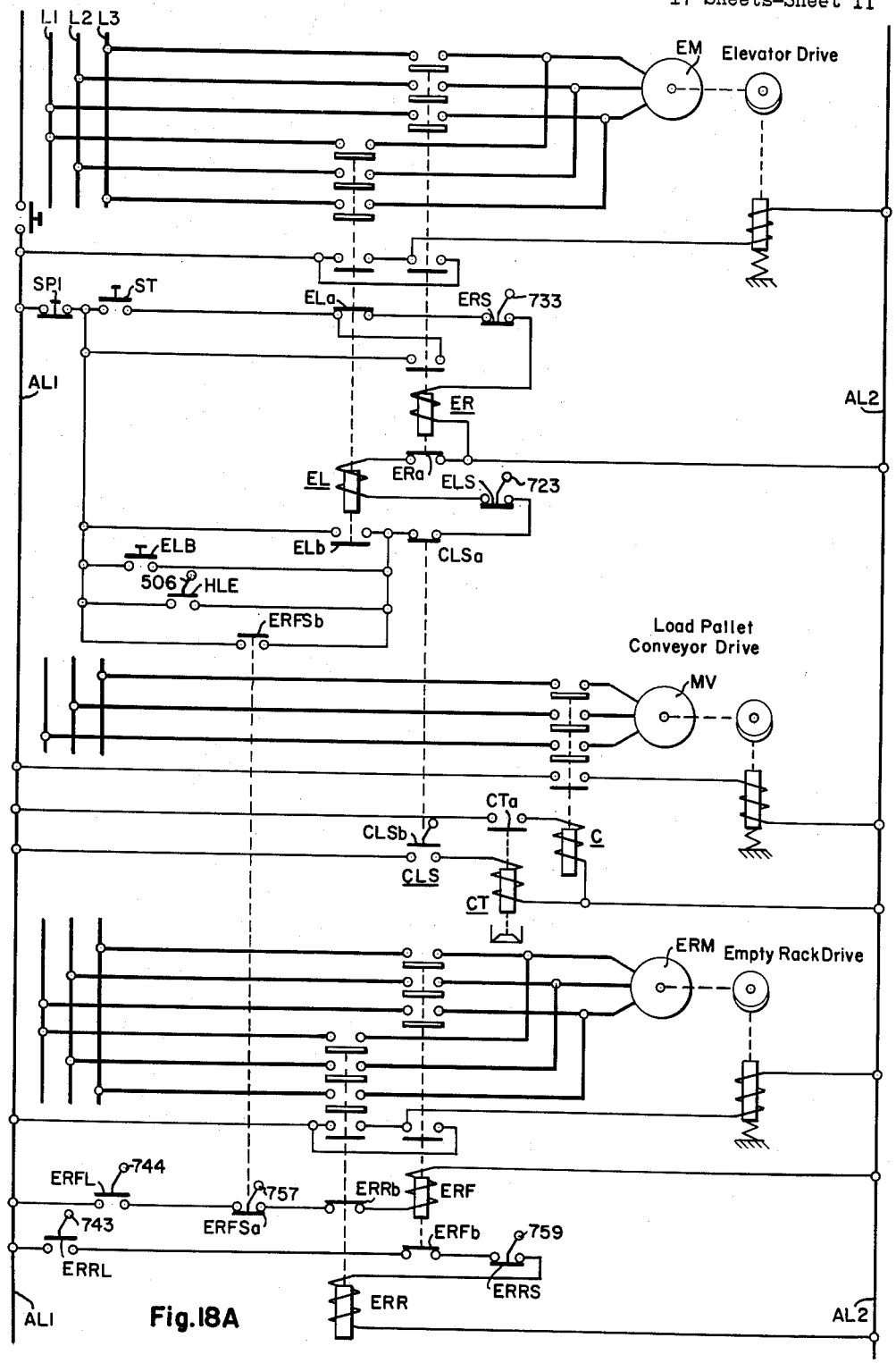

The Rack Removal Unit includes limit switches ERFS and ERRS (FIG. 18A). Engagement of the vehicle ERV with the arms 757 and 759 of these switches opens the switches ERFS and ERRS and stops the vehicle ERV in the forward and reverse positions respectively. The vehicle motor ERM is powered through an extensible cable 761.

The Stacking Unit (FIG. 6) includes a Loaded-Pallet Conveyor Array, a Buncher, a Carriage and a Clamper Unit. The Loaded-Pallet Conveyor Array is mounted in communication with the Empty Pallet Conveyor Unit with the Buncher between them. The Buncher is capable of bunching the blocks on loaded pallets advanced by the Loaded-Pallet Conveyors and permitting the empty pallets to pass through to the Empty-Pallet Conveyor Array, Empty-Pallet Conveyor Unit from which they are transmitted to the molding machines M1 and M2 via the Pallet Transfer Unit. The carriage is mounted movable on a track (425) and carries the Clamper Unit. The track extends from a position over the Buncher to a position where the blocks are stacked. The Clamper Unit is movable vertically in the Carriage. When the Carriage is over the Buncher, the Clamper Unit may be moved down to engage blocks, and when the Carriage is in the stacking area, the Clamper Unit may be moved down to deposit blocks on a stack.

The Loaded-Pallet Conveyor Array (FIGS. 1, 2, 5, 6) includes a plurality of conveyors 301 and 303 corresponding in number to the rows of pallets on a rack RA (FIGS. 1, 2, 5, 6) and arranged in an array corresponding to these rows. The apparatus actually shown in the drawings is capable of operation with racks RA of the type disclosed in the Besser leaflet. Such racks have two rows of two pallets each on each level. To cooperate with such racks the Loaded-Pallet Conveyor Array includes a pair of conveyors 301 and 303 so spaced as to correspond to the spacing between the rows of pallets PA on the racks.

Figure 5:
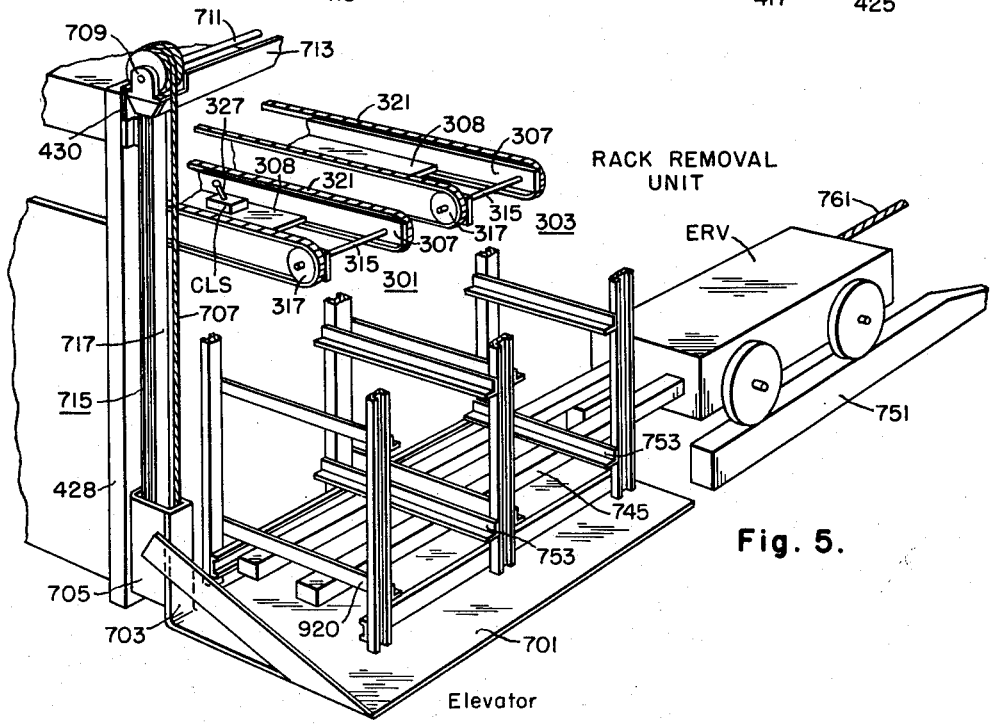
FIG. 5 is a view in perspective showing the cooperative relationship between the Elevator and the Rack Removal Unit according to this invention.
Figure 7:
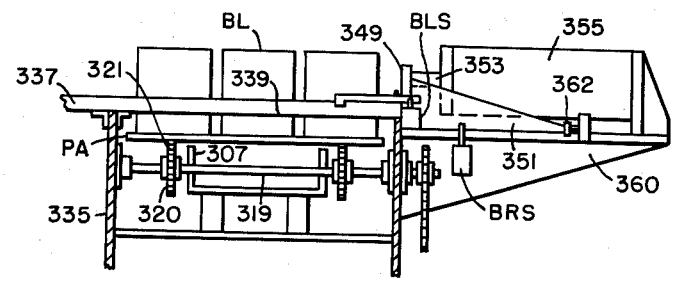
FIG. 7 is a fragmental view in end elevation as viewed from the direction towards which the conveyors are movable of a portion of the block stopping mechanism in accordance with this invention.

Each conveyor 301 and 303 includes a pair of strips 307 (FIG. 5) to which a cross strip 308 is secured. This strip assembly 307, 308 is mounted on a plurality of supports each including a pair of vertical strips 309 braced by cross strips 311 (FIG. 4). At one end there are bearings 313 in the strips 307 in which a shaft 315 carrying sprocket wheels 317 at each end externally to the strips 307 is rotatable (FIG. 5). Bearings 318 (FIGS. 2, 7) are also provided on the plates 335 near the other ends of the strips 307 through which a common shaft 319 (FIG. 7) passes. This shaft 319 carries sprocket wheels 320 which are mounted on each side of the strips 307 externally to these strips.

The sprocket wheels 317 and 320 extending from each end of the channels 307 are engaged by continuous chains 321. The chains 321 extend above the ends of the strips 307 and are thus capable of supporting loaded pallets PA. The common shaft 319 and the sprocket wheels 320 on this shaft are driven through gearing 325 by a motor MV (FIGS. 2, 18A). When the motor MV is rotated, the chains 321 are moved and thus are capable of advancing any pallets PA disposed on the chains. The strips 307 and the associated chains 321 of each conveyor 301 and 303 extend beyond the end supports 309—311 (FIGS. 3 and 5) a distance such that a rack 305 may be conveniently interlaced with the chains 321 so that when the chains are moved, the loaded pallets PA on any level of the rack RA are carried from the rack along the conveyors 301 and 303.

A limit switch CLS is mounted longitudinally spaced along the cross strip 308 of the conveyor 301 (FIGS. 2, 5, 18A). The actuating handle 327 of this switch extends above the chains 321 so that the switch may be actuated by pallets PA on the conveyor 301. The limit switch CLS is so disposed that it may be closed when the rack PA is interlaced with the conveyor 301 and a loaded pallet PA on a level of the rack drops on the conveyor chains 321. When actuated by the pallet PA, switch CLS closes to energize timer relay CT (FIG. 18A). The contact CT*a* of this relay closes instantaneously and remains closed, even after CLS is opened, for a time interval sufficient to enable the blocks BL on the pallet PA to move into engagement with the block stop 337.

The plates 335 extend on each side of the Loaded-Pallet Conveyor Array. The plates 335 serve to support the block stop plate 337. This block stop plate 337 is of L section and extends between the end plates 335 on each side of the Conveyor Array with its lower edge 339 (FIG. 7) above the conveyor chains 321 by a distance sufficient to permit unloaded pallets PA to pass through. The chains 321 and the sprocket wheels 320 extend to the far side of the stop plate 337 from the sprocket wheels 317 (FIG. 2) so that the empty pallets PA are positively carried under the plate 337 onto the Empty-Pallet Conveyor Unit. The plate 337 serves to stop the leading blocks BL of loaded pallets PA advanced by the conveyors 301 and 303 and to permit the empty pallets PA to pass through to the Empty-Pallet Conveyor Unit. The L-shaped plate 337 is so disposed along the conveyors 301 and 303 that with switch CLS released and open, the leading blocks BL on the leading pallets PA engage the stop 337 before relay CT drops out. When relay CT drops out, the motor MV is deenergized, but has sufficient inertia to move the loaded pallets PA so that the blocks BL on the leading pallets are in firm engagement with the plate 337 and the blocks BL on the following pallets are urged into firm engagement with the blocks on the leading pallets.

The Buncher includes a pusher plate 349 (FIG. 7) on one side of the Array which is adapted to engage the blocks BL and move them generally transversely to the L section stop plate 337. The pusher plate 349 is mounted on a frame 351 (FIG. 2) which is suspended from a rod 353 extending from a fluid cylinder 355 and reciprocable by the pressure in this cylinder. The rod 353 is engaged centrally with the pusher plate 349 and when it moves, under the fluid pressure in the cylinder, carries the plate and the frame 351 from which it extends, with it. The cylinder is mounted on the plate 335 on one side of the Loaded Pallet Conveyor Array. The position of the cylinder 355 is adjustable in the direction of travel of the rod 353 so that the extent of transverse movement of the plate 349 may be set.

The supply of air (or other fluid) to the cylinder 355 is controlled by a double acting valve BV (FIG. 18B) which may be positively set in one position or in the opposite position by energization of one or the other of a pair of solenoids SB1 or SB2. The solenoids SB1 or SB2 are adapted to be connected between conductors AL1 and AL2 by the closing of limit switches BLS or BRS (FIGS. 2, 7), respectively. When SB1 is actuated, the valve BV is set so that the fluid pressure in the cylinder advances the pusher plate 349 inwardly. When solenoid SB2 is actuated, the pressure in the cylinder is such that the pusher plate 349 is retracted.

Limit switches BLS and BRS are normally open. BLS is mounted on stop 337 so that it is actuated (closed) by leading blocks BL just as their forward movement is stopped (FIG. 2). This sets BV to move the pusher 349 inwardly. Switch BRS is mounted on the frame 360 in which the frame 351 slides and is actuable by a lip 362 on the frame 351 when the frame 351 reaches the extreme inward position. Actuation of switch BRS sets BV to cause the pusher 349 to return to its initial retracted position.

The Clamper Unit includes a clamper 361 suspended from a boom 363. The clamper 361 (FIGS. 6, 9, 10, 12, 13) includes a frame-like supporting structure comprising a pair of channels 365 and 367 on which are supported a pair of rectangular tubes 369 and 371 into each of which a rod 373 and 375 telescopes. A fixed clamping jaw 377 having an engaging area sufficient to engage one side 378 of a block assembly 380 is suspended from the face of one of the channels 365. Movable clamping jaws 379 and 381 are suspended from telescoping rods 373 and 375, respectively. A plate 383 is secured to the channels 365 and 366 below the tubes 369 and 371 defining a space between the tubes and the plate. In this space adjacent the ends of the tubes 369 and 371 into which the telescoping rods 373 and 375 pass, a pair of cylinders 385 and 387 are suspended from an angle bracket 389 secured to the tubes 369 and 371. Each of the cylinders 385 and 387 carries a rod 391 and 393 reciprocable by change of fluid pressure in the cylinders. Each of the rods 391 and 393 is secured above the center of a corresponding movable jaw 379 and 381, respectively, and depending on the direction in which pressure is applied in the corresponding cylinders 385 and 387 is capable of moving the jaw guided by the corresponding telescoping unit 369—373 and 371—375 inwardly and outwardly. The plate 383 below the cylinders 385 and 387 provides a surface for engagement with the tops of the blocks 380.

Figure 18B:
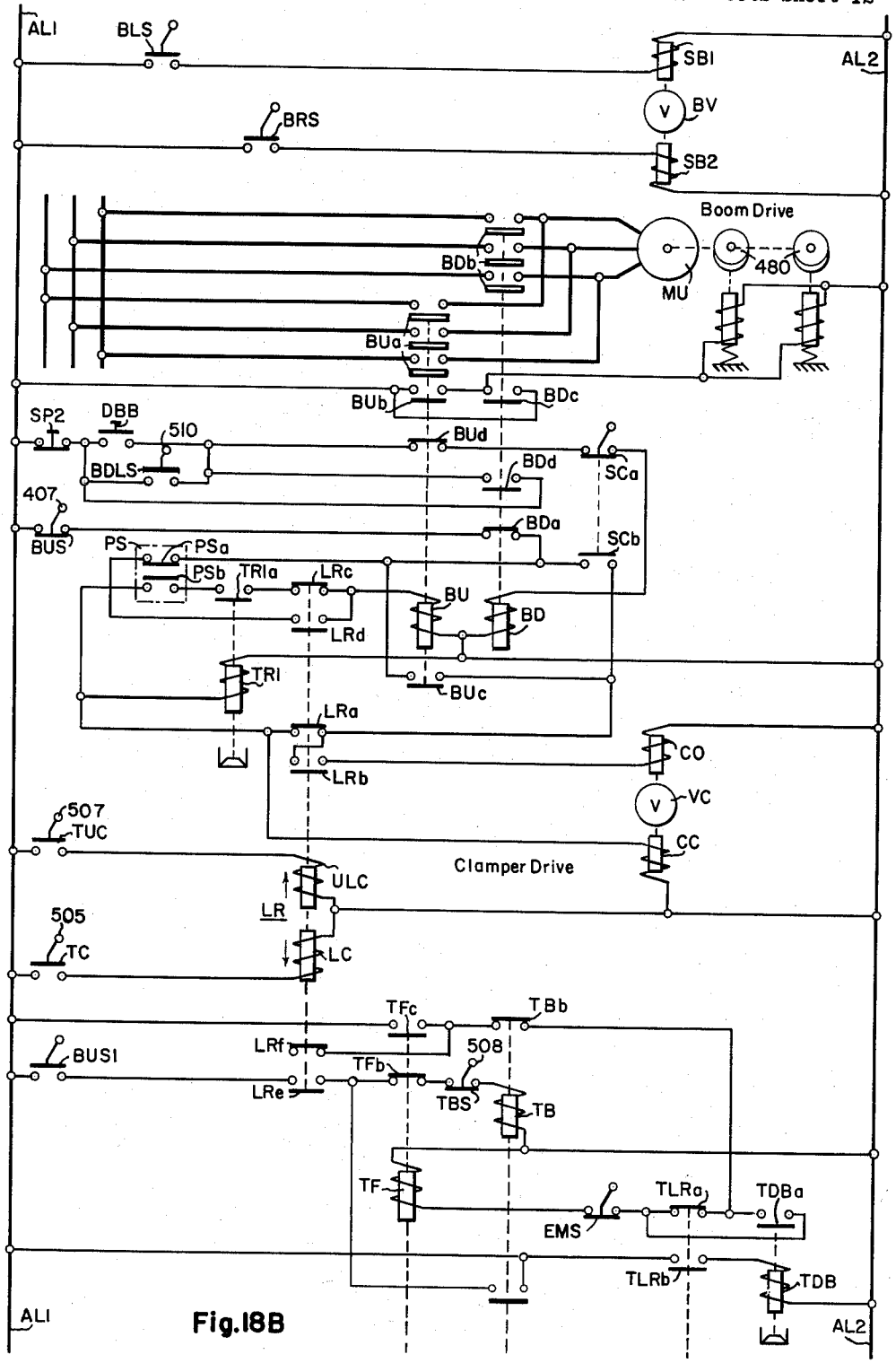

The fluid supply is common to the cylinders 385 and 387 and is controlled by a valve VC (FIG. 18B) which permits the pressure in either of the two opposite directions to be applied positively. The valve VC may be mounted on the I-beam 426 (FIG. 6) and may be connected by flexible tubes 400 and tubes extending along the boom 363 to the clamper cylinders 385 and 387. The valve VC is controlled by solenoids CU and CC. CC is adapted to be connected between conductors AL1 and AL2 through the boom limit switch BUS, which is open in the up position of the boom 363, back contact BD*a* of relay BD, contact SC*b* of slack cable switch SC, and contact LR*a* of latching relay LR (FIG. 18B). CO is adapted to be connected between AL1 and AL2 in a like circuit including latch-relay contact LR*b* instead of LR*a*. The actuation of CC causes the clamper 361 to close its jaws and the actuation CO causes the clamper to open its jaws. The latch relay LR (FIG. 18B) is set by coils LC and ULC. LC is adapted to be connected between AL1 and AL2 through limit switch TC which is closed when the boom 363 is approaching a tier 380 of blocks BL to be stacked. ULC is adapted to be connected between AL1 and AL2 through TUC which is closed when the boom 363 approaches the stacking position. The clamper also includes a pressure switch PS (FIG. 18B) which has back contacts PS*a* closed when the jaws 379 and 381 are retracted and open when the jaws 379 and 381 are in clamping position. This switch PS automatically controls the raising and lowering of the Clamper Unit. The Clamper Unit is raised with the block tier 380 when the closing of PS*b* indicates proper clamping of the tier 380 and is conditioned to be opened when PS*a* is closed.

The position of the cylinders 385 and 387 in the direction of the travel of the rods 391 and 393 may be adjustable so that the span of the jaws 377 and 379 and 381 may be set within limits to correspond to different dimensions of block assemblies in the direction between the jaws. In addition there may be more than two cylinder-jaw units where the dimension of the block assembly or tier 380 in the direction parallel to the jaw surfaces is long. Where the span between the jaws 377 and 379—381 is adequately long the buncher may be dispensed with.

The boom 363 (FIGS. 2, 9, 10, 11) consists of a pair of channels 395 and 397 braced by one or more cross strips 399 or by an elongated cross strip. The channels 395 and 397 are secured to a strip 401 which is in turn secured centrally across the tubes 369 and 371 of the clamper 361. The Clamper Unit is thus a rigid structure. An I-bolt 403 is mounted centrally between the ends of the strip 401; the bolt 403 serves as an anchor for a cable 405 for raising or lowering the Clamper Unit.

Figure 8:
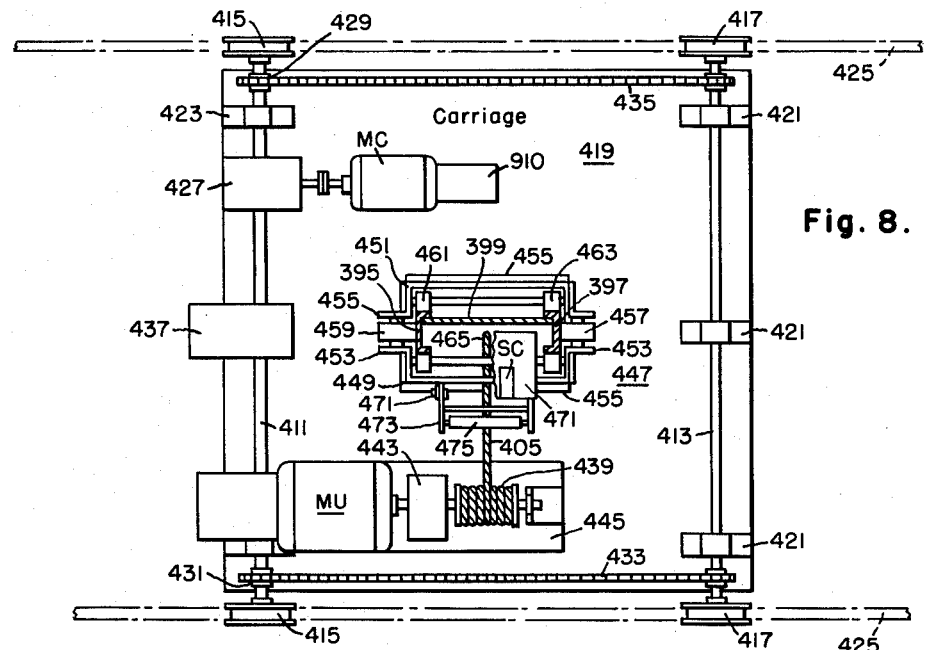
FIG. 8 is a plan view of the carriage in accordance with this invention.

The Carriage or trolley (FIGS. 6, 8, 9) includes a plurality of shafts 411 and 413 from the ends of which wheels 415 and 417 extend rotatable with the shafts. A plate 419 is suspended from the shafts 411 and 413 by bearings 421 and 423 secured along opposite sides of the plate 419 in which the shafts 411 and 413 are rotatable. The wheels 415 and 417 engage a track 425 extending from a position over the Buncher where the block assembly 380 is formed to a position just over the stacking platform or stacking conveyor SP where the blocks BL are stacked. The track 425 is mounted on channels 426 supported on their flanges on I-beam columns 428. Cross plates 430 extend between the channels 426.

The Carriage also includes a drive motor MC (FIGS. 8, 18C) which is connected through gearing 427 to one of the shafts 411. This shaft 411 is in turn connected through sprocket wheels 429 and 431 and chains 433 and 435 to the other shaft 413. When the motor MC is energized, the shafts 411 and 413 and the wheels 415 and 417 are rotated moving the Carriage in one direction or the other. For the purpose of retarding the motion of the Carriage, a brake 437 which engages the directly driven shaft 411 is mounted on the plate 419. The brake 437 is applied when an electromagnet 920 is energized by direct current (FIG. 18C) and is released when the electromagnet is deenergized. In addition, there is a brake 910 which is normally applied to the motor MC and is released when power is applied to the motor MC.

The Carriage also includes a winch comprising the cable 405 and a drum 439 on which the cable 405 may be wound or from which it may be paid out. The drum 439 is rotatable by a hoisting motor MU (FIGS. 6, 8, 9, 18B) through reduction gearing 443. The motor MU, gearing 443 and drum 439 are mounted on a raised platform 445 on the plate 419.

The plate 419 of the Carriage has a central generally rectangular opening from which a vertical housing 447 extends. This housing 447 is made up of channel shaped sections 449 and 451 with flanges 453 and 455 extending from both the long and the short edges of each of the channels. The channel sections are supported from the plate 419 by the flanges 455 extending from the short sides of the ends. The flanges 453 extending from the long sides of the ends are placed vertically face to face and serve as bearings for rollers 457 and 459 rotatable about axes near the upper and lower ends of the flanges. In addition, the sides of the channel sections 449 and 451 serve as bearings for upper and lower rollers 461 and 463 extending from each of the sides. The latter rollers 461 and 463 are rotatable about axes at right angles to the rollers 457 and 459 between the flanges. There are in all twelve rollers 457—459—461—463. The channels 395 and 397 which form the boom 363 engage these twelve rollers and are guided by them. The rollers 457 and 459 between the flanges 453 engage the faces of the channels 395 and 397 and the rollers 461 and 463 extending from the sides of the channel sections 449 and 451 engage the ends of the channels 395 and 397 of the boom 363. The channel section 449 facing the winch drum 439 is slotted and the sides of the section serve as a bearing for a sheave 465 which is rotatable in the slot 467. The cable 405 of the winch is in engagement with the sheave 465 and extends downwardly through the slot 467 and the plate 419 engaging the I-bolt 403 on the cross plate 401 of the clamper 361.

To the top of the channel section 449 in which the sheave 465 is rotatable, an angle bracket 471 is secured (FIGS. 8, 9, 10, 11, 18B). The slack cable limit switch SC is supported on the horizontal surface of this bracket 471. This switch SC has the back contact SCa and the front contact SCb (FIG. 18B). Below the horizontal surface of this bracket, a pair of arms 473 are pivotally supported and these arms carry a roller 475 between their free ends. The roller is centrally connected to the actuating arm 477 of the limit switch SC through a spring 479. The roller 475 engages the cable 405 which passes over the sheave 465 and by the force of gravity is capable of changing its position in accordance with the tension in the cable. When the cable is taut, the roller 475 is urged upwardly. When the cable is relaxed, the roller 475 drops downwardly under gravity. When the roller 475 is urged upwardly, SCa is closed and SCb open; when the roller drops downwardly, the switch SCb is closed and SCa is open.

A limit switch BUS (FIGS. 6, 9, 10) is mounted on the angle bracket 471. This switch BUS is normally closed. It has an actuating arm 407 which may be engaged by a block 473 on a cross piece of the boom 363 when the boom reaches the uppermost position and this engagement opens BUS.

A limit switch BUS1 (FIGS. 11, 18B) is also mounted on bracket 471. This switch BUS1 is actuable by two buttons 476 and 478, spaced longitudinally along the cross plate 399; button 478 is the higher. The arms of BUS1 are such that buttons 476 and 478 actuate BUS1 only while the boom is being raised and not when it is dropped. The switch BUS1 is normally open and remains closed only while actuated by one of the buttons. If the boom 363 drops only a short distance as would be the case when bunched blocks are being engaged (see FIG. 6) only button 476 is effective. During stacking the switch BUS1 is actuated by 478 because the stacking position is lower than the bunching position and requires that the boom be dropped lower. When the boom is being raised after stacking 478 actuates the switch BUS 1 and this starts the return of the Carriage or trolley while the boom 363 is still being raised.

The electrical circuit for controlling the winch is shown in FIG. 18B. This circuit includes contactors BU and BD which are connected to energize the winch motor MU so that it rotates in a direction such as to move the boom upwardly or downwardly. The contactor BU has front main contacts BUa, front auxiliary contacts BUb and BUc and a back auxiliary contact BUd. The contactor BD includes main contacts BDb, front auxiliary contacts BDc and BDd and a back contact BDa. The motor MU is adapted to be connected to conductors L1, L2, L3 through contacts BUa so as to be rotated to move the Clamper Unit upwardly and through contacts BDb so as to be rotated to move the unit downwardly. The coil of contactor BU is adapted to be connected between conductors AL1 and AL2 through limit switch BUS, interlock contact BDa, contact SCb, contact LRa of latching relay LR, contact PSb, contact TR1a of timer relay TR1, and contact LRc. BU can only be actuated if PSb is closed, that is if the jaws 379 and 381 are in clamping position. Once BU is actuated, the brakes 480 on motor MU are released by contact BUb; contact BUd prevents energization of the coil of BD and BUc shunts SC2 which opens once the cable 405 becomes taut. The coil of BD is adapted to be connected between AL1 and AL2 through stop button SP2, alternatively through button DBB which starts the stacking operation or limit switch BDLS, interlock contact BUd and SCa. Switch BDLS is mounted on channel 426 and is actuated by a loaded Clamper Unit as it approaches the stacking conveyor SP to start the downward movement of the boom 363. Once BD is actuated, DDc releases the brakes 480 on motor MU, BDa prevents actuation of BU, and BDd shunts out DBB and BDLS which are operated only instantaneously.

A plurality of limit switches EMS, LS1, LS2, LS3, BDLS, TC, HLE, TUC, TBS (FIGS. 6, 9) are mounted along the track 425. These switches are all mounted along one side of the track, LS1, LS2, LS3, TC, HLE, TUC from the channel 426 on the one side and EMS and TBS from the respective end cross plates 430. The actuating arms 501, 502, 503, 504, 510, 505, 506 and 507 respectively (FIG. 9) are actuable by a dog 418 extending from the plate 419, EMS, LS1, LS2 LS3, BDLS and TUC being actuable by the dog 418 on the forward movement of the plate and TC and HLE on the reverse movement of the plate 419. TBS is actuable by plate 419. The arms 501 through 508 and 510 are provided with rollers so that the dog 419 may roll over the arms without damaging them. Since the switches are on one side of track 425, they are not interfered with by the Clamper Unit as it is carried by the Carriage.

Switches EMS and TBS have normally closed contacts (FIG. 18B), LS1, LS2, LS3 have normally open contacts, and BDLS, HLE, TC and TUC normally open contacts. Switches EMS and TBS are so disposed that their contacts are opened when the Carriage reaches respectively the extreme forward position beyond the stacking position and the extreme reverse position over the Buncher. Switches LS1, LS2, LS3 are disposed along the track 425 spaced from each other so that the Carriage moves forward a distance equal to about half (or a similar fraction) of the dimension of the blocks BL in the direction along the track between the point where one is actuated and the point where the successive one is actuated. The positions of these switches LS1, LS2, LS3 are adjustable to accommodate blocks of different dimensions. Actuation of any of these switches closes its contact. LS1 and LS2 may be selectively connected for cooperation with LS3 in stacking by switch HS. With LS2 and LS3 in co-operation normal stacking is carried out on plate PS; with LS1 and LS3 in cooperation the blocks BL are stacked for tilting by the Tilting Unit to provide base tiers for the stack.

The closing of BDLS is effected while the Clamper Unit is advancing to the stacking platform SP and starts the Clamper Unit downward. HLE when closed in the return movement of the carriage starts the elevator moving downwardly to unload another pallet PA. TC and TUC control the Clamper Unit TUC conditioning the clamper to close and TC to open.

The Empty-Pallet Conveyor Unit is similar to the pallet conveyor disclosed in Patent 2,990,069. For the purpose of helping in the understanding of this invention and its relationship to Patent 2,990,069, the parts of the Empty-Pallet Conveyor Unit shown in FIGS. 1 and 2 of this application, are to the extent practicable labeled similarly to the corresponding parts of Patent 2,990,069. From this labelling the operation of the Empty-Pallet Conveyor Unit will be understood. The Empty-Pallet Conveyor Unit shown in Patent 2,990,069 is typical of conveyors which could be used cooperatively with the Loaded Pallet Conveyor Array. Other empty-pallet conveyors could be used in accordance with the broader aspects of this invention and this invention is not limited as to empty-pallet transfer to the disclosure of 2,990,069.

The Empty-Pallet Conveyor Unit includes the Empty-Pallet Conveyor Array and the Pallet Conveyor. The Array includes the pallet unloading channels 69 and 71 that receive empty pallets PA passed through plate 337 and transfers the pallets to the magazines 73 and 75. The plates (335 FIG. 2) may serve as a support for the unloading channels 69—71 and for the motor MV which drives the conveyors 301—303 and advances the empty pallets PA into the pallet unloader. Limit switch EP is closed when there are a predetermined number of pallets in the magazines 73 and 75 energizing motor PMC (FIG. 18D) which transfer the pallets PA through gravity branch channels 550 and 552 to the Pallet Conveyor. The Pallet Conveyor driven by motor PC (FIG. 18D) transfers the pallets to the Pallet Transfer Unit which distributes the pallets between the magazines MG1 and MG2. In Pallet Conveyor the pallets PA are advanced by chains 554 and 556 which are driven through chains 558 and 560 from motor PC.

The Pallet Transfer Unit may be vertically below the input end of the Pallet Conveyor and pallets may move downwardly over the portion of the Pallet Conveyor leading to the Transfer Unit. To prevent the pallets PA from moving at excessive speed, rubber pressure rollers 564 are provided over the branch 568 of the Pallet Conveyor where the downward movement takes place. These engage the pallets PA and retard their movement (FIGS. 16, 17).

A limit switch LSJ (FIG. 18D) is mounted on the channel forming a part of the Pallet Conveyor in a position such as to be actuated by pallets PA moving along the conveyor towards the Pallet Transfer Unit. This switch LSJ is normally open and must be closed to condition the Transfer Unit to change from transferring pallets PA from from one magazine MG1 or MG2 to the other MG2 or MG1. Thus there must be a pallet PA or LSJ before the change can take place. The pallets are so spaced in being fed to the Transfer Unit that the transfer magazine MGR is clear of pallets before the change takes place.

Figure 14:
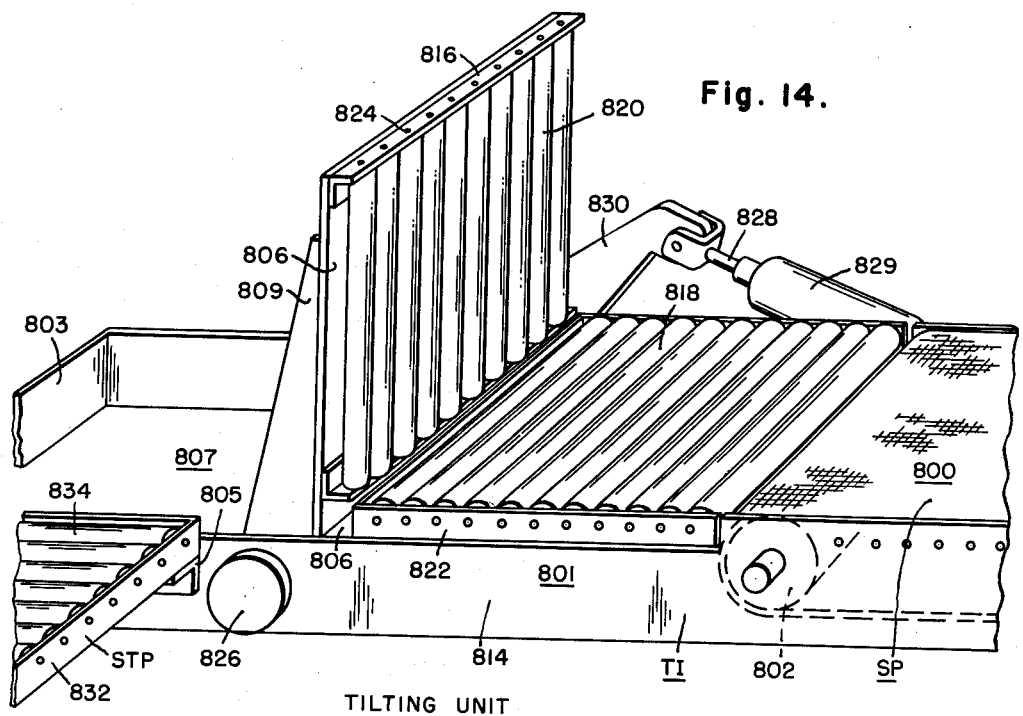
FIG. 14 is a view in perspective of the Tilting Unit according to this invention.

The Tilting Unit includes in addition to the stacking platform or conveyor SP the tilter TI, the storage platform STP and the transport platform TRP (FIGS. 2, 14, 15). The platforms SP and TRP and the tilter TI are mounted in a support consisting of parallel plates 801 terminating at the end adjacent the tilter TI in a cross plate 803. The region defined by the plates 801 and 803 form a recess 807 into which the tilter TI is pivoted. The frame STP is supported from angles 805 suspended from a plate 801 adjacent the recess 807 and an opposite plate.

The stacking platform SP includes a continuous belt 800 of metal openwork or other suitable material. The belt 800 passes over rollers 802 and 804 journaled in the plates 801, one of which 802 is driven by motor MS selectively in one direction or the other. A stack Z (or Z1) on the belt 800 may thus be moved toward the transport platform TRP or towards the tilter TI.

The transport platform TRP may be based on plates 801 in which rolls 808 may be journaled. The rolls 808 extend above the plates 801 and are in communication with the belt 800 so that a stack Z on the belt 800 readily moves onto platform TRP. Complete stacks Z may be thus moved to platform TRP for removal to trucks or to storage. Such removal is usually effected by a fork lift, the tines of which are engaged in the openings 810 of the lower tier 812 of the stack Z.

The tilter TI includes a rigid assembly consisting of platforms 814 and 816 at right angles to each other. Each platform consists of a plate 806 from which ribs 809 extend. The plates 806 are generally at right angles and one set of ribs 809 extends beyond the corner where the plates are joined. A shaft or pin 826 is secured to the extending ends of the ribs 809. The shaft 826 is journaled in the opposite plates 801. The outer surfaces of each of the platforms 814 and 816 are formed by rolls 818 and 820 at right angles. The rolls 818 are mounted rotatably in opposite angles 822 secured to the associated plate 806 and extend above the supporting edges of the angles 822; the rolls 820 are similarly mounted in opposite angles 824 and likewise extend above or outwardly from the supporting edges of the angles.

In the standby position of the tilter TI the platform 814 is horizontal and the rolls 818 are contiguous with the belt 800 so that when motor MS (FIG. 18C) is energized, a stack Z1 assembled on 800 may be readily moved to platform 814. In this position the ribs 809 secured to the plate 806 on which the platform 818 is mounted extend parallel to the plates 801.

Figure 18C:
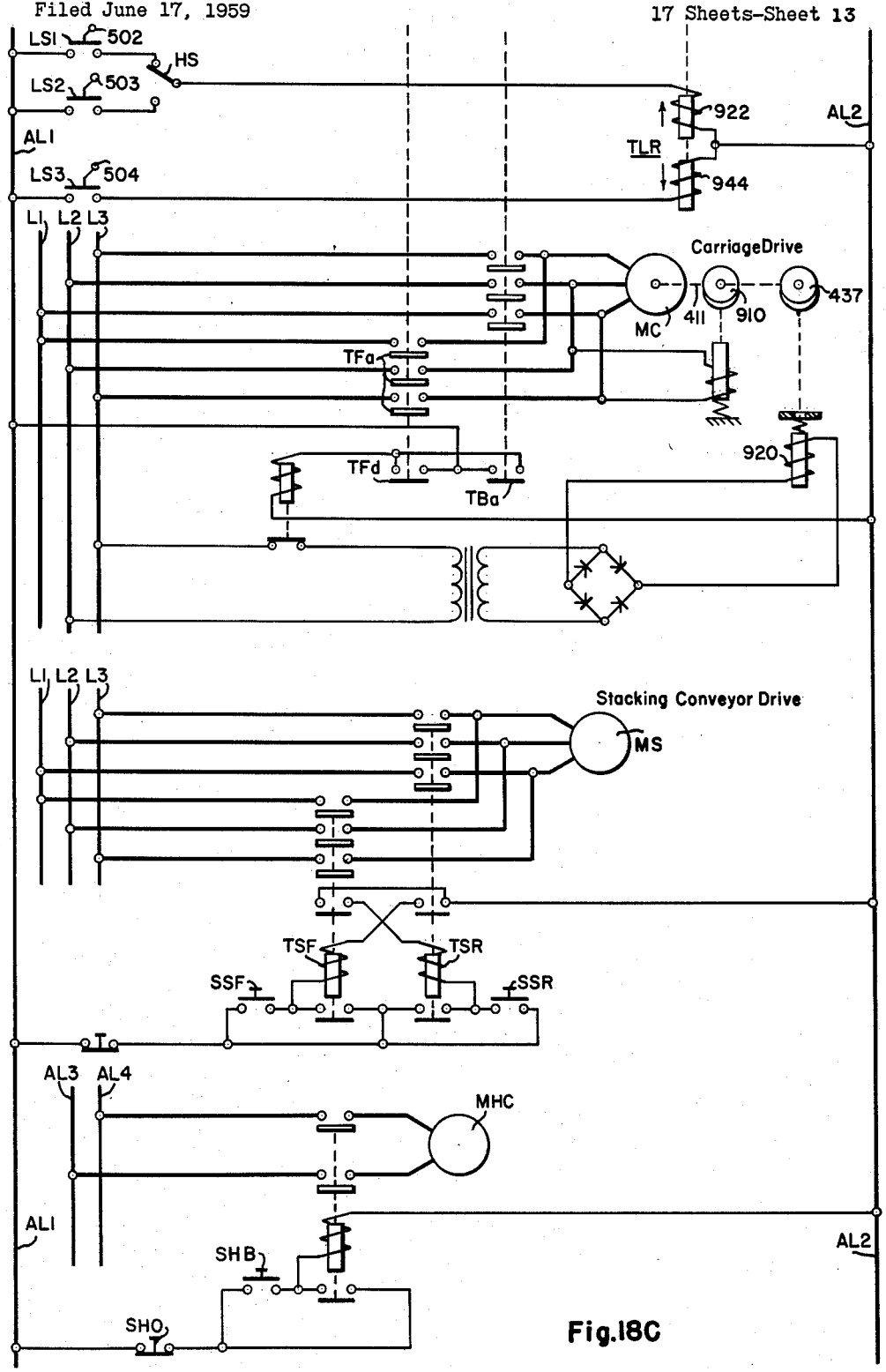

The shaft or pin 826 may be pivoted by a rod 828 driven by a piston (not shown) in a hydraulic cylinder 829 through a lever 830 to which the rod 828 (FIG. 14) is linked. The supply of fluid to the cylinder 829 is controlled by a motor MHC (FIG. 18C). By pivoting the shaft 826, the tilter TI may be pivoted so that platform 816 lies generally horizontally in the recess 807 and platform 814 is vertical, thus turning the stack Z1 at right angles.

The storage platform STP comprises rolls 834 mounted rotatably in plates 832 supported on the angles 805. The rolls 834 extend above the strips 832 and are coextensive with the rolls 820 so that a block Z1 may be readily moved from platform 816 to STP.

A stack Z1 assembled on platform SP with the blocks BL aligned and the openings 810 aligned vertically may be moved onto platform 818 by energizing motor MS. The motor MHC may be energized to turn the tilter TI so that the holes of the blocks BL in stack Z1 are horizontal. The stack Z1 may then be pushed by hand over rolls 820 and 834 so that it rests on platform STP.

The Tilting Unit includes a fork lift 840 (FIGS. 22 and 23) which may be set with its tines 842 horizontally. This lift removes the tiers 844 one-by-one from stack Z1 to provide base tiers for the stack Z (FIG. 15). The platform STP facilitates the transfer of tiers 844 to the platform SP since it permits ready engagement of the tines 842 in the openings 810 of each tier 844 in a position adjacent the platform SP.

The fork lift 840 includes a Clamper Unit and a Tine Unit.

The Clamper Unit includes a box-like support 1100 from one side of which a plate 1102 extends. The support 1100 and the plate 1102 carry handles 1104 by means of which the Clamper Unit may be manipulated. A fixed clamper jaw 1105 is bolted to one side of box 1100. A rectangular tube 1106 extends from the other side of the box 1100 and a movable jaw 1108 is suspended from a rod 1110 telescoping in the tube 1106. The jaw 1108 is carried by a piston rod 1112 actuable by a piston (not shown) in cylinder 1114. By varying the pressure on the piston the jaw 1108 may be closed or retracted. The jaws 1105 and 1108 have openings 1120 which are aligned. These removably support the Tine Unit.

The Tine Unit includes a support 1130 having an end cross member 1132 from which the tines 842 are suspended by bolts 1134. On the opposite side of the support 1130 a frame 1140 is secured. This frame carries pins 1142 in its opposite ends. The pins are tapered and adapted to engage the openings 1120 in the jaws 1105 and 1108. The frame 1140 includes arms 1150 for guiding the jaws 1105 and 1108.

The fork lift 840 can be used as a lift or with the Tine Unit removed as a clamper for manipulating the blocks. The fork lift is shown assembled in FIG. 22 with the jaw 1108 closed. To remove the Tine Unit the jaw 1108 is retracted releasing the Tine Unit. To assemble the fork lift 840 the Tine Unit is properly disposed adjacent the jaws with the aid of guides 1150 and the jaw 1108 is closed locking pins 1142 in holes 1120.

The Pallet Transfer Unit (FIGS. 16, 17) includes a transfer magazine MGR to which are joined transfer conveyors TC1 and TC2. The transfer conveyors TC1 and TC2 communicate with the magazines MG1 and MG2 respectively through branch channels BC1 and BC2 which incline towards the respective magazines and through which the pallets PA may drop into the magazines under gravity.

Figure 1:
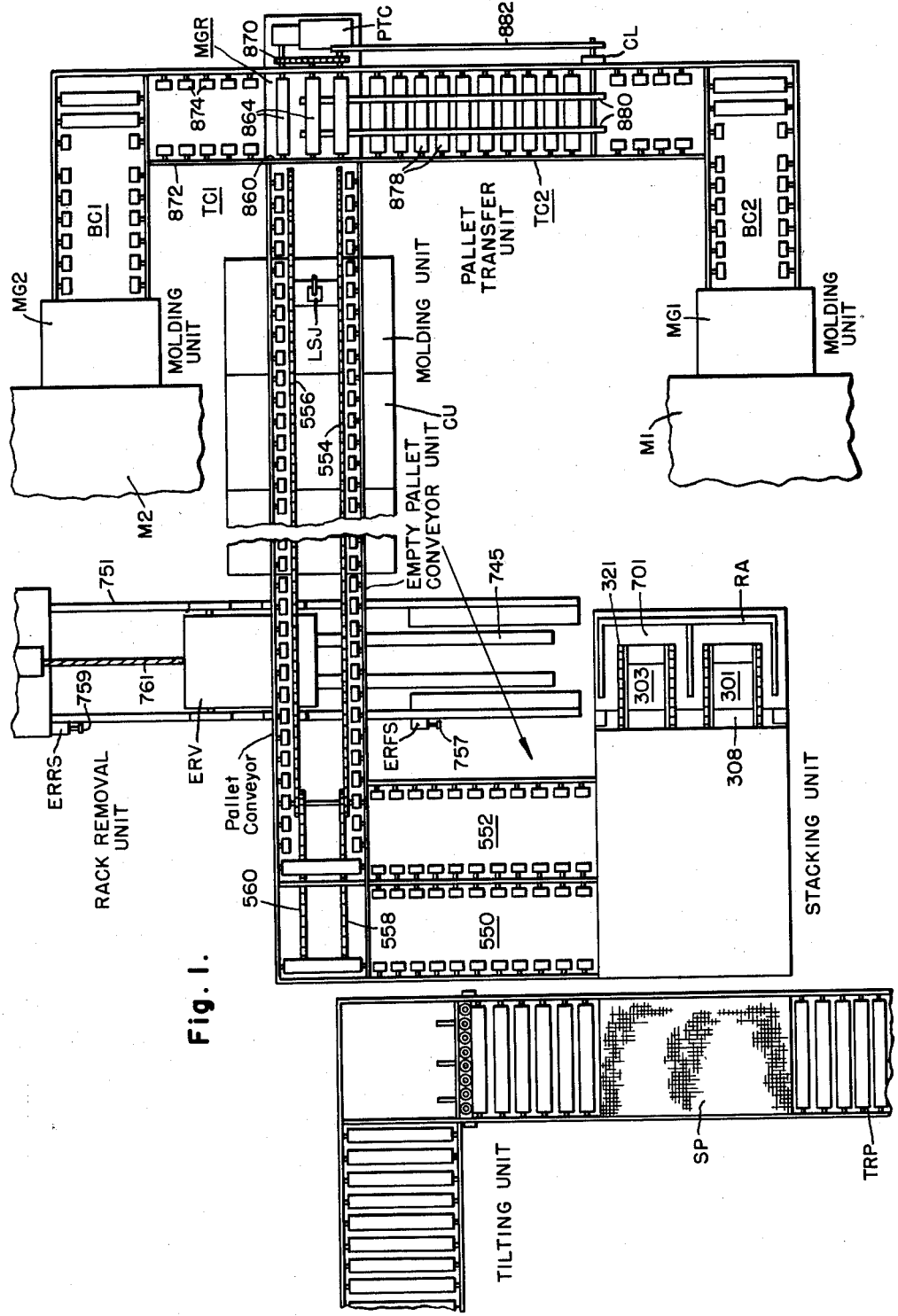
FIGURE 1 is a view in plan of apparatus in accordance with this invention with the track, carriage and clamping unit removed.

The transfer magazine includes a pair of opposite plates 860 in which rollers 864 are rotatably journaled (FIGS. 1, 16, 17). The rollers 864 are driven from a motor PTC (FIG. 18D) and through sprocket wheels 866 and a chain 870. The motor PTC may be selectively energized through contacts PTCL*a* or PTCR*a* of contactors PTCL or PTCR to rotate in one direction or the other. The rollers 864 are thus caused to advance the pallets along conveyor TC1 or conveyor TC2. The magazine MGR is contiguous to the Pallet Conveyor and the rollers 864 are symmetrically disposed and longitudinal with reference to the chains 554 and 556 so that pallets PA are readily deposited on the rollers 864. Only one pallet PA is deposited in the transfer magazine MGR at a time.

The transfer conveyor TC1 is inclined to the branch channel BC1 and pallets PA advanced to TC1 by rollers 864 move along TC1 under gravity. The conveyor TC1 includes opposite plates 872 contiguous with the plates 860. Rollers 874 are supported in plates 872 and the pallets PA are advanced along these rollers 874 by the rollers 864 and are thus deposited in the channel BC1 whence they are advanced to the magazine MG2.

Figure 18D:
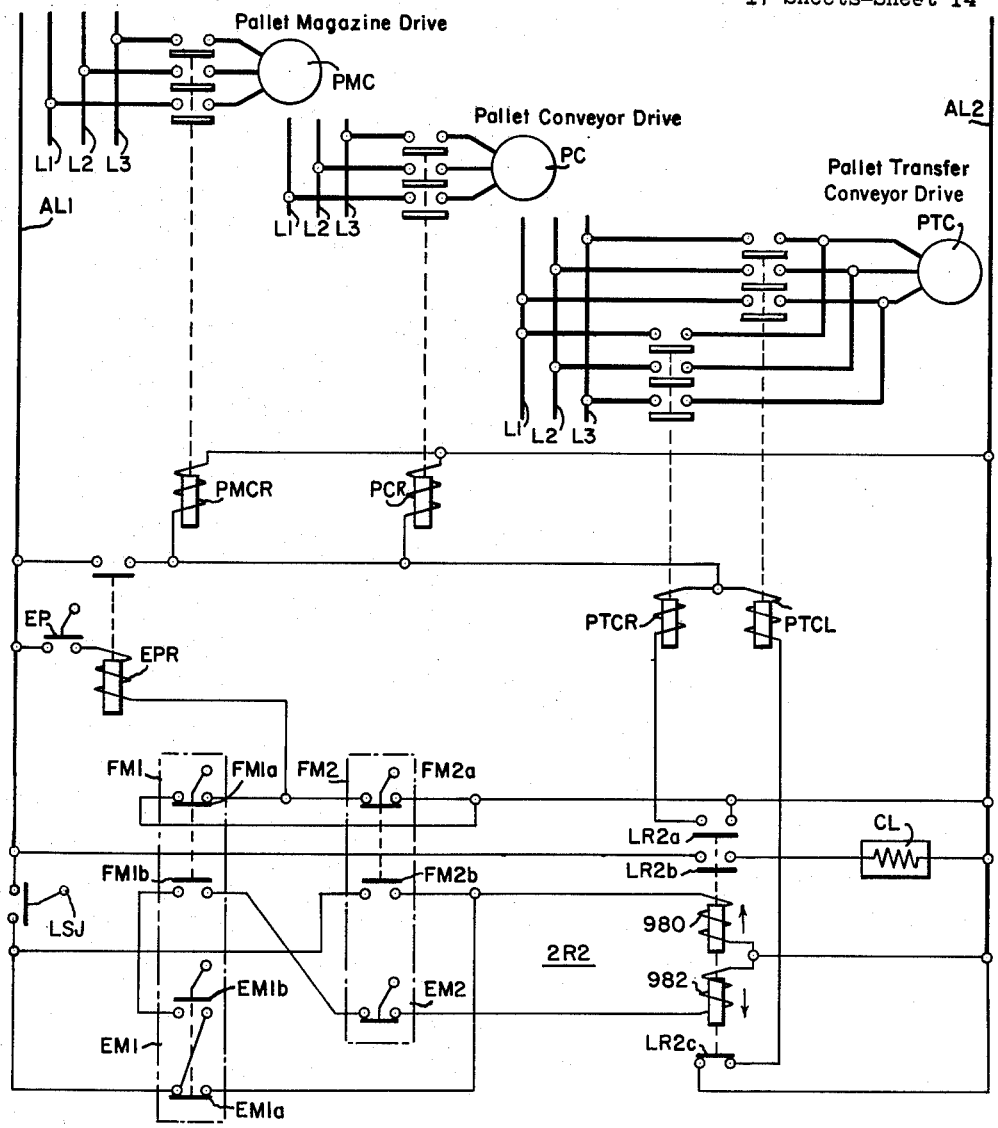

The transfer conveyor TC2 is power driven. This conveyor includes parallel plates 876 in which rollers 878 are rotatably mounted. The rollers 878 support belts 880 which are driven by belt 882 through clutch CL. The clutch CL may be electromagnetically actuated through front contact LR2*b* of latching relay LR2 (FIG. 18D). When the clutch CL is unactuated, the belt 880 is not moving. The conveyor TC2 terminates in a short inclined section 886 through which the pallets PA are moved by gravity over rollers 890 into the branch channel BC2.

The branch channels BC1 and BC2 (FIG. 1) are alike each including a pair of plates 892 and 894 respectively between which rollers 896 and 898 extending between the plates and short rollers 900 and 902 are rotatably mounted. The pallets from TC1 and TC2 are received by the rollers 896 and 898 respectively and transmitted under gravity to the magazines MG2 and MG1 respectively.

In each of the magazines MG1 and MG2 an empty-magazine limit switch EM1 and EM2 respectively and a full-magazine limit switch FM1 and FM2 respectively are provided. EM1 is disposed in the lower part of MG1 and has a back contact EM1*a* and a front contact EM1*b* (FIG. 18D), EM1 is actuated by the first pallet PA in the magazine MG1 opening EM1*a* and closing EM1*b*. EM2 has a single back contact which is opened by the first pallet in MG2.

FM1 and FM2 each has a back contact FM1*a* and FM2*a* and a front contact FM1*b* and FM2*b*. FM1*a* or FM2*a* are opened and FM1*b* or FM2*b* closed when the associated magazine MG1 or MG2 is full of pallets PA. When both magazines are empty MG1 predominates.

*Standby*

In the standby condition of the apparatus, the conductors L1, L2 and L3, and conductors AL1 and AL2 and AL3 and AL4 are energized and are ready to energize the various components of the control system.

Buttons ST and ELB (FIG. 18A) are open so that contactors EL and ER are deenergized and motor EM is at rest. The Elevator is at rest; usually platform 701 will be left in its lowest position. Limit switch CLS is unactuated so that relay CT and contactor C are deenergized and the loaded-pallet conveyor motor MV is at rest. ERFL and ERRL are open and ERR and ERF are deenergized so that the empty-rack vehicle ERV is in retracted position.

BLS and BRS are open and BV is deenergized (FIG. 18B). Pusher plate 349 (FIG. 7) is retracted. DBB and BDLS are open and the clamper jaws 379 and 381 may be assumed to be open. It may be assumed that the Clamper Unit is over the bunching position so that LC was last actuated and latching relay LR is in the position shown in FIG. 18B. PS is in the low-pressure position with PS*a* closed and PS*b* open. BU and BD are unactuated and motor MU deenergized and the boom 363 is in the raised position. BUS is open and BUS1 is also open. Contactors TB and TF are deenergized through BUS1 and MC is deenergized so that the carriage is at rest. TF*a* and TB*a* are then open and the magnetic stopping brake 920 is actuated and engaged (FIG. 18C). Depending on the last setting of the switches LS1, LS2, LS3, latching relay TLR is in the up or down position. It may be assumed that it is in the position shown in the drawing.

With the Carriage over the bunching position, TBS is open and EMS closed and HLE is open.

SSF and SSR (FIG. 18C) are open so that MS is deenergized. SHB is open so that MHC is deenergized and the Tilting Unit is in the position shown in FIGS. 14 and 15. With no pallets PA on magazines 73 and 75 EP is open and PMC and PC are deenergized. Assume there are no pallets in magazines MG1 and MG2 so that EM1, EM2, FM1, FM2 are in the positions shown in FIG. 18D. Latching relay LR2 is then in the position shown in FIG. 18D. PTCL and PTCR and PTC are deenergized.

Operation

In the operation of the apparatus a rack RA having loaded pallets PA on it is removed usually, by means of a fork-lift truck, from the curing furnace and moved to the Elevator. It is assumed that at the start there is no stack of base tiers and such a stack is to be prepared. HS is then set to connect LS1 to the coil 922 of TLR (FIG. 18C). Push button ST is then actuated momentarily and energizes ER in circuit AL1, SP1, ST, EL$a$, ERS, ER, AL2. Contactor ER is closed and the platform 701 is raised to the highest position where ERS is opened and ER deenergized and the platform stopped. The fork-lift then raises rack RA so that its legs are at the level of platform 701 and deposits the rack so that the lowest shelf 920 of the rack overlaps the conveyors 301 and 303.

Push button ELB is now momentarily actuated and energizes EL in circuit AL1, SP1, ELB, CLS$a$, ELS, EL, ER$a$, AL2. EL is locked in through EL$b$. Platform 701 is lowered until ELS is opened and reclosed. When ELS is opened, EL is deenergized stopping the platform 701. At this point the lowest shelf 920 of the rack RA engages the conveyors 301 and 303 (FIGS. 3 and 4) and closes switch CLS. CLS$a$ opens to assure that the circut through the coil of EL is opened (in the event ELS recloses before EL has completely opened). CLS$b$ closes completing an energizing circuit through the coil of CT. CT picks up instantaneously closing contact CT$a$ and energizing contactor C. MV is then energized and the conveyors 301 and 303 are advanced removing the loaded pallets PA from the lowest shelf 920 of the rack RA. CLS is released when the pallets on 301 have passed over arm 327, but CT remains closed long enough to enable the blocks BL on the pallets PA to engage stop plate 337 (FIG. 2) and to actuate BLS (FIG. 18B). Pusher 349 is then moved inwardly by solenoid SB1 to bunch the blocks BL. This reopens BLS and eventually actuates BRS which returns plate 349 to the retracted position. At this point CT is reset and motor MV deenergized.

Now if the blocks BL are properly bunched, the operator momentarily closes DBB. Relay BD is now energized in certain AL1, SP2, DBB, BU$d$, SC$a$, BD, AL2, and locked in through BD$d$. Motor MU is energized through BD$d$ and moves the Clamper Unit downwardly so that the jaws 377, 379, 381 (FIGS. 10, 12) enclose the bunched blocks BL. When the Clamper Unit leaves the uppermost position BUS closes. When the Clamper Unit reaches the lowermost position, the slack-cable limit switch SC (responsive to the slackness of the cable 405, FIG. 10) is set with SC$a$ open and SC$b$ closed (FIG. 18B).

BD is now deenergized reclosing BD$a$ which starts the closing of the jaws 379, 381 by energizing solenoid CC of VC (FIG. 18B) in circuit AL1, BUS, BD$a$, SC$b$, LR$a$, CC, AL2. VC now opens and the tier of blocks BL are clamped. In addition, the coil of TR1 is energized in circuit AL1, BUS, BD$a$, SC$b$, LR$a$, TR1, AL2. TR1 takes a predetermined time interval to close its contact TR1$a$ to assure that the blocks BL are properly clamped. After the blocks BL are clamped, the pressure switch PS opens PS$a$ and closes PS$b$ (FIG. 18B). After TR1$a$ is closed, BU is energized in circuit AL1, BUS, BD$a$, SC$b$, LR$a$, PS$b$, TR1$a$, LR$c$, BU, AL2. BU is locked in through BU$c$. MU is energized in the raising direction through BU$a$.

The Clamper Unit now raises the block. SC$b$ is opened but this has no effect because BU$c$ is closed. SC$a$ recloses. When the Clamper Unit reaches the uppermost position, BUS opens. The circuit through BU is opened through BUS and MU is deenergized. BUS1 was closed momentarily and the coil of TF is energized in circuit AL1, BUS1, LR$f$, TB$b$, TLR$a$, EMS, TF, AL2 (FIG. 18B) and locked in at TF$c$. MC is now energized through TF$a$ advancing the carriage forwardly.

TBS (FIG. 9) which had been open with the carriage 447 at the back end of the track 425 is now closed and as the carriage 447 advances, TUC is closed. The closing of TUC energizes ULC raising LR (FIG. 18B). LR$e$ closes but the circuit through TB remains open at TF$b$. LR$f$ opens but the circuit through TF remains closed at TF$c$. The carriage 447 (FIG. 9) continues to move forwardly now closing BDLS (FIG. 18B). BD is now energized in circuit AL1, SP2, BDLS, BU$d$, SC$a$, BD, AL2, and the Clamper Unit with its load starts moving downwardly while it is moving forwardly. BUS closes.

LS1 (FIG. 18C) is now closed energizing coil 922 and actuating TLR. TLR$a$ opens to deenergize TF and stop motor MC. TLR$b$ closes actuating TDB which closes TDB$a$ after a predetermined time interval. TDB$a$ shunts TLR$a$. The reclosing of TF$b$ does not actuate TB because BUS1 is open.

By now the jaws 377, 379, 381 of the clamper 361 (FIGS. 10 and 12) engage the platform SP (FIG. 15). SC$a$ then opens deenergizing motor MU and SC$b$ closes. CO is now energized in circuit AL1, BUS, BD$a$, SC$b$, LR$b$, CO, AL2. The tier of blocks BL is now released from the clamper and rests on SP. The tier deposited is the first tier on SP. The blocks are positioned similarly to the lowest tier 940 of the stack Z1 shown on platform 814 (FIG. 15). PS (FIG. 18B) now resets PS$a$ reclosing and PS$b$ reopening. TR1 is deenergized and TR1$a$ opens.

BU is now energized in circuit AL1, BUS, BD$a$, PS$a$, LR$d$, BU, AL2 and the Clamper Unit starts upwardly. As the Clamper Unit is now raised, button 478 actuates switch BUS1 and TB is now actuated in circuit BUS1, LR$e$, TF$b$, TBS, TB, AL2 and is locked in at TB$c$. The carriage 447 now starts back. When the Clamper Unit reaches the uppermost position, BUS opens deenergizing MU.

On the way back, the carriage closes TC (FIGS. 9, 18B) resetting LR. Then the carriage closes HLE (FIG. 18A). EL is then actuated in circuit AL1, SP1, HLE, ER$a$, CLS$a$, EL$s$, EL, AL2. EM is energized dropping 701 another step limited by ELS. The second shelves 942 of loaded pallets PA from the bottom are now deposited on 301 and 303. In the meantime TBS has opened and the carriage 447 has stopped.

The above described operation is now repeated, TF being actuated through TDB$a$ moving the Carriage forward. But this time the closing of LS1 has no effect since TLR$a$ is open but the closing of LS3 energizes coils 944 and TLR. TDB is now reset, TDB$a$ opened and motor MC stopped. The deposit of the second tier of blocks on the base tier is now completed. The second tier is set in a position corresponding to the second tier 946 on Z1 (FIG. 15). The above described operation is now continued until the complete stack Z1 is formed.

It has been found convenient to form Z1 partly by hand in spite of the circumstance that the blocks BL of the different tiers are aligned. The labor required in this case is minimal; the displacement produced by LS1 and LS3 facilitate the stacking.

When stack Z1 is completed, switch SSF (FIG. 18C) is closed to actuate contactor TSF. MS is energized to advance the stack Z1 onto platform 814. SHB (FIG. 18C) is then closed to energize MHC which supplies fluid to actuate lever 830 (FIG. 14) and pivot platform 814 to the vertical position and 816 to the horizontal position.

Stack Z1 is now set with the holes 810 in its block BL horizontally and parallel to platform PS. The stack Z1 is then moved by the operator over rollers 820 and 834 onto platform STP and then button SHO is opened to reset MHC and the titler 806 returns to its initial position.

The fork-lift 840 (FIG. 15) now moves the upper tier 950 of Z1 to the platform SP and this tier 950 becomes the base tier 952 for a stack Z. HS (FIG. 18C) is now set so that it connects LS2 to coil 922 and the above described stacking operation is repeated. But this time a stack Z with the blocks in alternate tiers 954, 956 (FIG. 15) staggered is produced. This stack is moved to platform TRP by closing CSR (FIG. 18C). From TRP stack Z may be moved to trucks or a storage area.

The rack RA is unloaded in producing the stored stack Z1 and later each time in producing the stacks Z. Each rack RA is unloaded before the Elevator reaches the position at which ERFL is closed (FIGS. 3, 4, 18B). The Elevator is moved to this position by the closing of HLE on the return of the carriage 447 from stacking the last levels on the rack. In this position, ELS is opened and maintained open by button 731 so that the Elevator is stopped. The closing of ERFL (FIG. 18A) energizes the coil of ERF in circuit AL1, ERFL, ERFS, ERR*b*, ERF, AL2. Motor ERM is then actuated causing the rack unloading vehicle ERV (FIG. 1) to move so that its tines 745 are under the empty rack RA. When the vehicle ERV has advanced to the proper position, ERFS is actuated by the vehicle and ERFS*a* is opened to deenergize ERF. In addition, ERFS*b* is closed energizing motor EM and dropping the Elevator so that the empty rack RA rests on the tines 745. At this point the Elevator closes ERRL energizing the coil of ERR in circuit ERRL, ERF*b*, ERRS, ERR. The vehicle ERV with the empty rack RA on its tines 745 is then withdrawn until it opens ERRS and stopped. The rack RA may then be removed from the tines 745 for further use.

While the blocks BL were being bunched and stacked the empty pallets PA moved into the magazines 73 and 75 of the Empty-Pallet Conveyor Unit (FIG. 2). When there are a predetermined number of empty pallets PA in the magazines, switch EP (FIGS. 2, 18D) is closed energizing the coil of EPR in circuit AL1, EP, EPR, FM1*a* (or EM2*a*), AL2. PMCR and PCR are then actuated energizing PMC and PC to move the chains 970, 972 and the chains 554, 556, 558, 560 (FIG. 1) to advance the empty pallet PA into the Pallet Transfer Unit.

When the first pallet PA closes LSJ, the coil 980 of latching relay LR2 is energized in circuit AL1, LSJ, EM1*a*, 980, AL2. The subsequent actuation of LR2 then energizes the coil of PTCR to energize motor PTC (FIG. 16). In addition, CL is actuated. PTC rotates in a direction such as to move the pallets PA along transfer conveyor TC2 into magazine MG1 (FIG. 17). The first pallee in MG1 actuates EM1 closing EM1*b* and opening EM1*a* but this has no effect since LR2 remains latched.

The pallets continue to be supplied to magazine MG1 until this magazine is full. Then FM1 is actuated closing FM1*b* and opening FM1*a*. This energizes coil 982 of latching relay LR2 when LSJ is closed by a pallet in circuit AL1, LSJ, EM1*b* FM1*b*, EM2, 982, AL2. LR2 is then actuated closing LR2*c* and PTCR is deenergized and PTCL actuated to reverse the motor PTC. Pallets are then supplied to MG2. EM2 opens but this has no effect, nor does the opening of FM1*b* as pallets in MG1 may be used. But when MG2 becomes full and FM2 is actuated, coil 980 is energized through LSJ and FM2*b*, PTCR is then energized unless MG1 is also full and EPR is deenergized. In the latter event PMC, PC, and PTC are deenergized and the pallet line is quiescent. If MG1 is empty when MG2 is partly filled, EM1 resets and coil 980 is energized through EM1*a*. Pallets are then supplied to MG1 until it is filled.

*Modified Clamper*

The clamper shown in FIGS. 19, 20 and 21 has the advantage over the clamper shown in FIGS. 6, 9, 10, 12, 13 that unlike the latter when the modified clamper is lowered to engage a tier 380 of blocks BL, the jaw 377' corresponding to the one (377) against which the movable jaws 379, 381 (FIGS. 6, 9, 10, 12, 13) clamp the tier need not be precisely positioned near the corresponding end of the tier 380. To accomplish this object the jaw 377' cooperative with the sliding jaws 379' and 381' (corresponding to 379, 381) is pivotally mounted. To facilitate the understanding of the modified clamper, parts of the modified clamper are labelled with primed numbers the same as those labelling the corresponding parts of the clamper including fixed jaw 377.

The modified clamper includes a frame-like supporting structure 1000 made up of a base plate 1002 and side walls 1004 having portions extending parallel to the base plate. A pair of rectangular tubes 369' and 371' are supported on the frame 1000 and into each of these tubes a rod 373' and 375' telescopes. The slidable clamping jaws 379' and 381' are suspended from the rods 373' and 375' respectively.

The plate 1002 is provided with bearing bosses 1010 on the side opposite to the jaws 379' and 381' and on these bosses a hinge pin 1012 is rotatable. The hinge pin 1012 is secured to plates 1014 which are in turn secured to the jaw 377' so that by rotation of the hinge pin 1012 the jaw 377' can be pivoted between a vertical position (FIG. 21) and an angle of about 30° or 45° to the vertical (FIG. 20). This movement is effected by a rod 1015 actuable through a piston (not shown) by fluid in a cylinder 1016. The rod 1015 is connected through a linkage 1017 to the hinge pin 1012 so that when the rod 1015 is retracted into the cylinder 1016, the jaw 377' is at an angle and when the rod 1015 is out, the jaw 377' is vertical.

The bosses 1010 and pin 1012 are spaced from the end of the frame 1000 a predetermined distance. A plate 1020 is suspended from the end of the frame 1000 extending beyond the end. The projecting edge of this plate 1020 is spaced from the jaw 377' in its angular position (FIG. 20) so as not to interfere with the movement of the jaw 377'. The plate 1020 is so positioned that in the position of the clamper in which the tier 380 is engaged the plate 1020 actuates the arm 1022 of a limit switch LZ. The limit switch LZ when actuated performs the same function as the slack-cable switch SC (FIG. 18C) and eliminates the necessity that the cable 405 be slack when the clamper is engaging a tier 380 of blocks BL.

Between the overhanging portions of the side members 1004 and the base 1002 cylinders 385' and 387' are mounted. Each of the cylinders 385' and 387' includes a piston (not shown) which carries a rod 391' and 393' reciprocable by change of fluid pressure on the pistons within the cylinders. Each of the rods 391' and 393' is secured above the center of a corresponding slidable jaw 379' and 381' parallel to the rods 373' and 375'. The fluid in cylinders 385', 387' and 1016 are so controlled that the jaws 379' and 381' are in the retracted position when jaw 377' is at an angle and jaws 379' and 381' are slid to the clamping position at the same time that jaw 377' is set in the vertical position. The arm 1015 for 377' has a shorter stroke than the arms 391' and 393' so that 377' is vertical before 379' and 381' have completed the closing movement.

In the use of the clamper with the boom 363 to which clamper is secured raised the jaws 379', 381' are retracted and 377' is at an angle. The boom is set so that when the clamper is lowered, the lower end of the jaw 377' extends beyond the edge 378 of the tier 380 and the clamping and raising operations and the lowering operations may be carried out effectively regardless of variations in the dimensions of the tier or in its balance.

Variation in the dimensions of the tier may result from variations in the dimensions of individual blocks BL which make up the tier 380. Such variations exist among blocks of the same type but are particularly marked for blocks BL of different types which may be stacked. When the clamper is lowered to engage a tier 380, the angular deflection of the jaw 377' prevents the engagement of its lower edge with the top of a tier 380 with wider blocks BL for which the edge 378 may extend a greater than normal distance. During lowering of a tier 380 the pivotal jaw 377' permits a weight-unbalanced tier 380 to be set on the stack without any overlap which might result in the falling off of the blocks on the overlapping edge.

A raising operation is on the whole carried out as described above in connection with the other clamper 361. When the boom is lowered so that jaws 377', 379' and 381' encompass the tier 380, switch LZ is actuated by the plate 1020. One contact of this switch opens the circuit for motor MU stopping the lowering of the boom 363. The other contact of LZ closes the clamper circuit causing the jaws 377', 379', 381' to engage the tier. The remainder of the stacking operation is the same as described above. During unclamping the control is through slack-cable switch SC. At this time the tier 380 is dropped either on a base tier 844 or on tiers above the base tier and the cable 405 is slack.

Conclusion

While a preferred embodiment has been disclosed herein, it is realized that many modifications thereof are feasible. This invention then is not to be restricted except insofar as is necessitated by the spirit of the prior art.

We claim as our invention:

1. A system for selective transfer of pallets including a main pallet conveyor, drive means connected to said conveyor when enabled for driving said conveyor, a transfer magazine connected to said conveyor for receiving pallets from said conveyor, a first storage magazine, a second storage magazine, means connecting each of said storage magazines to said transfer magazine, selective drive means connected to said transfer magazine when enabled for transferring pallets selectively from said transfer magazine to said first or said second storage magazine, means connected to said selective drive means and said first and second magazines for disabling said selective drive means when said first and second magazines are full, and means connected to said disabling means and to said drive means for said conveyor for disabling said conveyor when said selective drive means is disabled.

2. Pallet handling apparatus for delivering pallets from a storage pallet magazine selectively to a first pallet utilization magazine or to a second pallet utilization magazine comprising, a delivery conveyor connected to said storage magazine when actuated advancing pallets from said storage magazine, first transfer conveyor means connected to said delivery conveyor for transferring pallets from said delivery conveyor to said first magazine, second transfer conveyor means connected to said delivery conveyor for transferring pallets from said delivery conveyor to said second magazine, and switch means responsive to the pallets in one of said utilization magazines for interrupting the flow of pallets along the associated transfer conveyor means and causing the flow of pallets along the other transfer conveyor means associated with the other utilization magazine when a predetermined number of pallets are deposited in said first magazine and for maintaining the interruption of the flow of pallets along said first-named associated transfer conveyor means and for maintaining the flow of pallets along said other associated conveyor means, as aforesaid, so long as there are pallets in said first magazine regardless of decrease in the number of said last-named pallets in said first magazine, until a predetermined number of pallets are deposited in said other magazine.

3. Pallet handling apparatus for delivering pallets from a storage pallet magazine selectively to a first pallet utilization magazine or to a second pallet utilization magazine comprising, a delivery conveyor connected to said storage magazine when actuated advancing pallets from said storage magazine, first transfer conveyor means connected to said delivery conveyor for transferring pallets from said delivery conveyor to said first magazine, second transfer conveyor means connected to said delivery conveyor for transferring pallets from said delivery conveyor to said second magazine, switch means responsive to the pallets in one of said utilization magazines for interrupting the flow of pallets along the associated transfer conveyor means and causing the flow of pallets along the other transfer conveyor means associated with the other utilization magazine when a predetermined number of pallets are deposited in said first magazine and for maintaining the interruption of the flow of pallets along said first-named associated transfer conveyor means and for maintaining the flow of pallets along said other associated conveyor means, as aforesaid, so long as there are pallets in said first magazine, regardless of decrease in the number of said last-named pallets in said first magazine, until a predetermined number of pallets are deposited in said other magazine, and additional switch means responsive to the pallets in both said magazines and connected to said delivery conveyor for disabling said delivery conveyor when and only so long as said predetermined number are deposited in both said magazines.

4. Pallet handling apparatus for delivering pallets selectively to a first pallet utilization magazine or to a second pallet utilization magazine, said pallets being removed from each of said magazines respectively one at a time while they are being so delivered comprising, a delivery conveyor, first transfer conveyor means connected to said delivery conveyor for transferring pallets from said delivery conveyor to said first magazine, second transfer conveyor means connected to said delivery conveyor for transferring pallets from said delivery conveyor to said second magazine, and switch means responsive to the pallets in one of said utilization magazines for interrupting the flow of pallets along the associated transfer conveyor means and causing the flow of pallets along the other transfer conveyor means associated with the other utilization magazine when a predetermined number of pallets are deposited in said first magazine and for maintaining the interruption of the flow of pallets along said first-named said associated transfer conveyor means and for maintaining the flow of pallets along said other associated conveyor means, as aforesaid, on the removal of at least some of the pallets from said first magazine following said interruption of the flow of pallets along said transfer conveyor means and the causing of the flow of pallets along said other transfer conveyor means as aforesaid.

5. A system for selective transfer of pallets including a main pallet conveyor, drive means connected to said conveyor when enabled for driving said conveyor, a transfer magazine connected to said conveyor for receiving pallets from said conveyor, a first stroage magazine, a second storage magazine, means connecting each of said storage magazines to said transfer magazine, selective drive means connected to said transfer magazine when enabled for transferring pallets selectively from said transfer magazine to said first or said second storage magazine, pallets being removed from said storage magazines respectively while pallets are being transferred from said transfer magazine to said storage magazines, and means connected to said selective drive means and said first and second magazines for disabling said selective drive means when said first and second magazines are full.

References Cited in the file of this patent

UNITED STATES PATENTS

| | | |
|---|---|---|
| 1,432,086 | Plonka | Oct. 17, 1922 |
| 1,565,840 | Wise | Dec. 15, 1925 |

(Other references on following page)

UNITED STATES PATENTS

| | | |
|---|---|---|
| 1,856,884 | Popov | May 3, 1932 |
| 2,486,415 | Huntar | Nov. 1, 1949 |
| 2,558,751 | Hebert | July 3, 1951 |
| 2,581,568 | Wooley | Jan. 8, 1952 |
| 2,609,947 | Couchman et al. | Sept. 9, 1952 |
| 2,732,084 | Chausee et al. | Jan. 24, 1956 |
| 2,788,134 | Miller | Apr. 9, 1957 |
| 2,828,871 | Bardsley et al. | Apr. 1, 1958 |
| 2,844,263 | Dreyer | July 22, 1958 |
| 2,866,564 | Kuper | Dec. 30, 1958 |
| 2,869,737 | Thomas | Jan. 20, 1959 |
| 2,993,583 | Sykes | July 25, 1961 |